(12) United States Patent
Huang et al.

(10) Patent No.: US 12,526,443 B2
(45) Date of Patent: Jan. 13, 2026

(54) CODING VIDEO DATA USING OUT-OF-BOUNDARY MOTION VECTORS

(71) Applicant: QUALCOMM Incorporated, San Diego, CA (US)

(72) Inventors: Han Huang, San Diego, CA (US); Yao-Jen Chang, San Diego, CA (US); Chun-Chi Chen, San Diego, CA (US); Marta Karczewicz, San Diego, CA (US); Vadim Seregin, San Diego, CA (US); Yan Zhang, San Diego, CA (US); Zhi Zhang, Munich (DE)

(73) Assignee: QUALCOMM Incorporated, San Diego, CA (US)

( * ) Notice: Subject to any disclaimer, the term of this patent is extended or adjusted under 35 U.S.C. 154(b) by 328 days.

(21) Appl. No.: 18/153,949

(22) Filed: Jan. 12, 2023

(65) Prior Publication Data

US 2023/0247216 A1    Aug. 3, 2023

Related U.S. Application Data

(60) Provisional application No. 63/299,366, filed on Jan. 13, 2022.

(51) Int. Cl.
*H04N 19/513* (2014.01)
*H04N 19/44* (2014.01)

(52) U.S. Cl.
CPC ........... *H04N 19/513* (2014.11); *H04N 19/44* (2014.11)

(58) Field of Classification Search
CPC .................... H04N 19/513; H04N 19/44
USPC .................................................. 375/240.15
See application file for complete search history.

(56) References Cited

U.S. PATENT DOCUMENTS

| | | | |
|---|---|---|---|
| 10,306,256 B2 * | 5/2019 | Laroche | H04N 19/44 |
| 11,589,054 B2 * | 2/2023 | Xu | H04N 19/176 |
| 11,838,540 B2 * | 12/2023 | Lee | H04N 19/577 |
| 2008/0094505 A1 * | 4/2008 | Pai | H04N 7/012 |
| | | | 348/E5.065 |
| 2009/0323813 A1 * | 12/2009 | Maciel De Faria | H04N 19/56 |
| | | | 375/240.24 |
| 2019/0028114 A1 * | 1/2019 | Fannes | H03M 7/30 |

(Continued)

OTHER PUBLICATIONS

Browne et al. ("Algorithm Description for Versatile Video Coding and Test Model 15" JVET Oct. 2021) (Year: 2021).*

(Continued)

*Primary Examiner* — Matthew David Kim
(74) *Attorney, Agent, or Firm* — Shumaker & Sieffert, P. A.

(57) ABSTRACT

An example device for decoding video data includes one or more processors implemented in circuitry and configured t: form first and second prediction blocks using first and second motion vectors and combine the first and second prediction blocks according to BDOF to form a final prediction block. For at least one sample location, the one or more processors are configured to determine that a first predictor for the at least one sample location is outside of a boundary of the first reference picture; determine that a second predictor for the at least one sample location is within a boundary of the second reference picture; set the first predictor equal to the second predictor; and determine a final BDOF value for a sample at the at least one sample location using the first predictor and the second predictor.

30 Claims, 20 Drawing Sheets

EXTENDED CU REGION IN BDOF

(56) References Cited

U.S. PATENT DOCUMENTS

| | | | |
|---|---|---|---|
| 2019/0138882 A1* | 5/2019 | Choi | G06N 3/048 |
| 2020/0053379 A1* | 2/2020 | Han | H04N 19/52 |
| 2020/0084468 A1* | 3/2020 | Chien | H04N 19/176 |
| 2020/0204812 A1* | 6/2020 | Wang | H04N 19/52 |
| 2020/0204824 A1* | 6/2020 | Lai | H04N 19/126 |
| 2020/0226791 A1* | 7/2020 | Pellegrin | H04N 19/647 |
| 2020/0296420 A1* | 9/2020 | Karczewicz | H04N 19/13 |
| 2020/0366906 A1* | 11/2020 | Winken | H04N 19/463 |
| 2021/0092390 A1* | 3/2021 | Chen | H04N 19/82 |
| 2022/0030268 A1* | 1/2022 | Le Leannec | H04N 19/176 |
| 2022/0060688 A1* | 2/2022 | Galpin | H04N 19/463 |
| 2023/0224472 A1* | 7/2023 | Chen | H04N 19/52 375/240.02 |
| 2024/0137554 A1* | 4/2024 | Liu | H04N 19/139 |

OTHER PUBLICATIONS

Chen Y., et al., "Description of SDR, HDR and 360° Video Coding Technology Proposal by Qualcomm and Technicolor—Low and High Complexity Versions", JVET-J0021, Joint Video Exploration Team (JVET) of ITU-T SG 16 WP 3 and ISO/IEC JTC 1/SC 29/WG 11, 10th Meeting: San Diego, US, Apr. 10-20, 2018, pp. 1-42.

Chen Y.W., et al., "AHG12: Enhanced Bi-Directional Motion Compensation", JVET-Y0125, Joint Video Experts Team (JVET) of ITU-T SG 16 WP 3 and ISO/IEC JTC 1/SC 29, 25th Meeting, by Teleconference, Jan. 12-21, 2022, pp. 1-4.

Chen Y.W., et al., "EE2: Enhanced Bi-Directional Motion Compensation (Test 2.2)", JVET-Z0136-v1, Joint Video Experts Team (JVET) of ITU-T SG 16 WP 3 and ISO/IEC JTC 1/SC 29, 26th Meeting, by teleconference, Apr. 20-29, 2022, pp. 1-5.

Han Y., et al., "CE4.4.6: Improvement on Merge/Skip Mode," JVET-L0399_r2, Joint Video Exploration Team (JVET) of ITU-T SG 16 WP 3 and ISO/IEC JTC 1/SC 29/WG 11, JVET-L0399, 12th Meeting: Macao, CN, Oct. 3-12, 2018, pp. 1-6.

He Y., et al., "CE4-Related: Encoder Speed-Up and Bug Fix for Generalized Bi-Prediction in BMS-2.1", JVET-L0296, Joint Video Experts Team (JVET) of ITU-T SG 16 WP 3 and ISO/IEC JTC 1/SC 29/WG 11, 12th Meeting: Macao, CN, Oct. 3-12, 2018, pp. 1-5.

Henry F., et al., "Residual Coefficient Sign Prediction", 4th JVET Meeting, Oct. 15, 2016-Oct. 21, 2016, Chengdu, (The Joint Video Exploration Team of ISO/IEC JTC1/SC29/WG11 and ITU-T SG.16 WP 3), No. JVET-D0031, Oct. 20, 2016 (Oct. 20, 2016), JVET-D0031-v2, JVET-D0031-v4, XP030150258, pp. 1-6.

Huang H., et al., "Cross-Check of JVET-Y0125 (AHG12: Enhanced Bi-Directional Motion Compensation)", JVET-Y0219-v1, Joint Video Experts Team (JVET) of ITU-T SG 16 WP 3 and ISO/IEC JTC 1/SC 29, 25th Meeting, by Teleconference, Jan. 12-21, 2022, pp. 1-3.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Karczewicz M., et al., "Common Test Conditions and Evaluation Procedures for Enhanced Compression Tool Testing", JVET-Y2017-v1, Joint Video Experts Team (JVET) of ITU-T SG 16 WP 3 and ISO/IEC JTC 1/SC 29, 25th Meeting, by teleconference, Jan. 12-21, 2022, pp. 1-12.

Lin Z-Y., et al., "CE10.2.1: OBMC", JVET-L0101-v1, Joint Video Experts Team (JVET) of ITU-T SG 16 WP 3 and ISO/IEC JTC 1/SC 29/WG 11, 12th Meeting: Macao, CN, Oct. 3-12, 2018, pp. 1-7.

Seregin V., et al., "CE4-3.1a and CE4-3.1b: Unidirectional Local Illumination Compensation with Affine Prediction", Joint Video Experts Team (JVET) of ITU-T SG 16 WP 3 and ISO/IEC JTC 1/SC 29/WG 11, JVET-O0066-v1, 15th Meeting, Gothenburg, SE, Jul. 3-12, 2019, pp. 1-5.

Seregin V., et al., "Exploration Experiment on Enhanced Compression beyond VVC capability (EE2)", JVET-Y2024-v2, Joint Video Experts Team (JVET) of ITU-T SG 16 WP 3 and ISO/IEC JTC 1/SC 29, 25th Meeting, by teleconference, Jan. 12-21, 2022, pp. 1-15.

Su Y-C., et al., "CE4-related: Generalized Bi-prediction Improvements Combined from JVET-L0197 and JVET-L0296", Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L0646-v5, pp. 1-6.

Su Y-C., et al., "CE4-Related: Generalized bi-prediction Improvements", Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L0197-v4, pp. 1-3.

Winken (Fraunhofer) M., et al., "CE10: Multi-Hypothesis Inter Prediction (Test 10.1.2)", JVET-M0425-v2, Joint Video Experts Team (JVET) of ITU-T SG 16 WP 3 and ISO/IEC JTC 1/SC 29/WG 11, 13th Meeting: Marrakech, MA, Jan. 9-18, 2019, Marrakech, (The Joint Video Exploration Team of ISO/IEC JTC1/SC29/WG11 and ITU-TSG.16), No. JVET-M0425 Jan. 2019 (Jan. 7, 2019), pp. 1-14, XP030200865.

Browne A., et al., "Algorithm Description for Versatile Video Coding and Test Model 15 (VTM15)", JVET-X2002-v1, Joint Video Experts Team (JVET) of ITU-T SG 16 WP 3 and ISO/IEC JTC 1/SC 29, 24th Meeting, by teleconference, Oct. 6, 2021-Oct. 15, 2021, Dec. 28, 2021, XP093038321, XP030299394, pp. 1-115.

International Search Report and Written Opinion—PCT/US2023/060611—ISAEPO—Jul. 18, 2023, 21 Pages.

Partial International Search Report—PCT/US2023/060611—ISA/EPO—May 2, 2023, 16 Pages.

"Text of ISO/IEC DIS 23090-3:202X Versatile Video Coding (2nd edition)", Information technology—Coded Representation of Immersive Media—Part 3: Versatile Video Coding, 135. MPEG Meeting, Jul. 12, 2021-Jul. 16, 2021, Online, (Motion Picture Expert Group or ISO/IEC JTC1/SC29/WG11) No. n20614, Aug. 19, 2021, pp. 1-519, XP030297551.

* cited by examiner

CODING VIDEO DATA USING OUT-OF-BOUNDARY MOTION VECTORS

This application claims the benefit of U.S. Provisional Application No. 63/299,366, filed Jan. 13, 2022, the entire contents of which are hereby incorporated by reference.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for coding video data using out-of-boundary motion vectors. In general, video coding relates to coding a sequence of pictures. Each picture may be partitioned into blocks, which may then be predicted and coded. Prediction of a block may be intra-prediction (spatial prediction within the same picture) or inter-prediction (temporal prediction from a previously coded picture). When performing inter-prediction, a reference block for a current block may be identified using a motion vector. In some cases, the motion vector may refer to an area of a reference picture that is partially or completely outside of the boundaries of the reference picture. This disclosure describes techniques for addressing such scenarios. In particular, this disclosure describes decoder-side motion vector refinement using bilateral matching techniques. While such techniques may be referred to as "decoder-side," a video encoder may also perform such techniques during a decoding loop within the video encoder.

As an example, motion information may be refined using bi-directional optical flow (BDOF). In general, BDOF can be performed on a per-sub-block or per-sample basis. A block of video data may be bi-directionally inter-predicted using two motion vectors. The motion vectors refer to respective reference blocks, which may be used to form prediction blocks that are then combined to form a final prediction block. When forming the prediction blocks, the motion information for a sample or sub-block may be refined, which generally includes comparing neighboring samples of both reference blocks to determine offsets to be applied to the motion information. In some cases, the neighboring samples may be outside of a picture boundary of a reference picture to which one of the motion vectors refers. When one of two predictors for a sample is outside of the picture boundary, according to the techniques of this disclosure, the out-of-bounds (OOB) predictor may inherit the value of the non-OOB predictor for BDOF. In this manner, BDOF can be performed even when one or more predictors are outside of the reference picture boundary, which may improve the final prediction block, thereby reducing residual values and bitrate needed to code the residual values.

In one example, a method of decoding video data includes determining that a block of video data is to be predicted using bi-directional optical flow (BDOF); forming motion information for the block, the motion information including a first motion vector referring to a first picture of a first reference picture list and a second motion vector referring to a second reference picture of a second reference picture list; forming a first prediction block using the first motion vector and a second prediction block using the second motion vector; combining the first prediction block with the second prediction block according to BDOF to form a final prediction block, wherein for at least one sample location of the final prediction block, the method includes: determining that a first predictor for the at least one sample location is outside of a boundary of the first reference picture; determining that a second predictor for the at least one sample location is within a boundary of the second reference picture; setting the first predictor equal to the second predictor; and determining a final BDOF value for a sample at the at least one sample location using the first predictor and the second predictor.

In another example, a device for decoding video data includes a memory configured to store video data; and one or more processors implemented in circuitry and configured to: determine that a block of the video data is to be predicted using bi-directional optical flow (BDOF); form motion information for the block, the motion information including a first motion vector referring to a first picture of a first reference picture list and a second motion vector referring to a second reference picture of a second reference picture list; form a first prediction block using the first motion vector and a second prediction block using the second motion vector; combine the first prediction block with the second prediction block according to BDOF to form a final prediction block, wherein for at least one sample location of the final prediction block, the one or more processors are configured to: determine that a first predictor for the at least one sample location is outside of a boundary of the first reference picture; determine that a second predictor for the at least one sample location is within a boundary of the second reference picture; set the first predictor equal to the second predictor; and determine a final BDOF value for a sample at the at least one sample location using the first predictor and the second predictor.

In another example, a device for decoding video data includes means for determining that a block of video data is to be predicted using bi-directional optical flow (BDOF); means for forming motion information for the block, the motion information including a first motion vector referring to a first picture of a first reference picture list and a second motion vector referring to a second reference picture of a second reference picture list; means for forming a first prediction block using the first motion vector and a second prediction block using the second motion vector; means for combining the first prediction block with the second prediction block according to BDOF to form a final prediction block; means for determining that a first predictor for at least one sample location of the final prediction block is outside of a boundary of the first reference picture; means for determining that a second predictor for the at least one sample location is within a boundary of the second reference picture; means for setting the first predictor equal to the second predictor; and means for determining a final BDOF value for a sample at the at least one sample location using the first predictor and the second predictor.

In another example, a computer-readable storage medium has stored thereon instructions that, when executed, cause a processor to: determine that a block of video data is to be predicted using bi-directional optical flow (BDOF); form motion information for the block, the motion information including a first motion vector referring to a first picture of a first reference picture list and a second motion vector referring to a second reference picture of a second reference picture list; form a first prediction block using the first motion vector and a second prediction block using the second motion vector; combine the first prediction block with the second prediction block according to BDOF to form a final prediction block, wherein for at least one sample location of the final prediction block, the one or more processors are configured to: determine that a first predictor for the at least one sample location is outside of a boundary of the first reference picture; determine that a second predictor for the at least one sample location is within a boundary of the second reference picture; set the first predictor equal to the second predictor; and determine a final BDOF value for a sample at the at least one sample location using the first predictor and the second predictor.

The details of one or more examples are set forth in the accompanying drawings and the description below. Other features, objects, and advantages will be apparent from the description, drawings, and claims.

DETAILED DESCRIPTION

Figure 1:
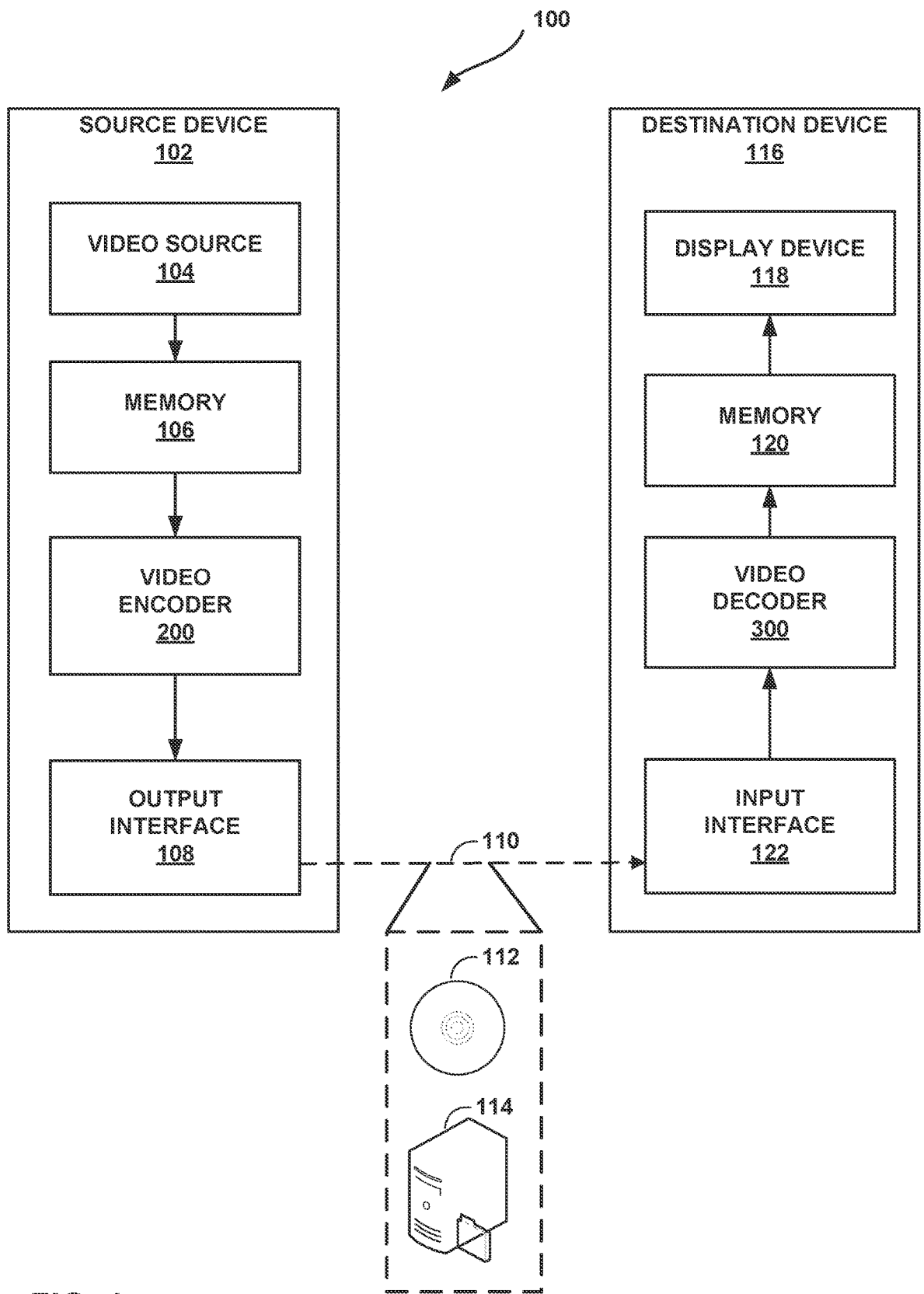
FIG. 1 is a block diagram illustrating an example video encoding and decoding system that may perform the techniques of this disclosure.

In general, this disclosure describes techniques for coding video data using out-of-boundary motion vectors. In general, video coding relates to coding a sequence of pictures. Each picture may be partitioned into blocks, which may then be predicted and coded. Prediction of a block may be intra-prediction (spatial prediction within the same picture) or inter-prediction (temporal prediction from a previously coded picture). When performing inter-prediction, a reference block for a current block may be identified using a motion vector. In some cases, the motion vector may refer to an area of a reference picture that is partially or completely outside of the boundaries of the reference picture. This disclosure describes techniques for addressing such scenarios. In particular, this disclosure describes decoder-side motion vector refinement using bilateral matching techniques. While such techniques may be referred to as "decoder-side," a video encoder may also perform such techniques during a decoding loop within the video encoder.

As an example, motion information may be refined using bi-directional optical flow (BDOF). In general, BDOF can be performed on a per-sub-block or per-sample basis. A block of video data may be bi-directionally inter-predicted using two motion vectors. The motion vectors refer to respective reference blocks, which may be used to form prediction blocks that are then combined to form a final prediction block. When forming the prediction blocks, the motion information for a sample or sub-block may be refined, which generally includes comparing neighboring samples of both reference blocks to determine offsets to be applied to the motion information. In some cases, the neighboring samples may be outside of a picture boundary of a reference picture to which one of the motion vectors refers. When one of two predictors for a sample is outside of the picture boundary, according to the techniques of this disclosure, the out-of-bounds (OOB) predictor may inherit the value of the non-OOB predictor for BDOF. In this manner, BDOF can be performed even when one or more predictors are outside of the reference picture boundary, which may improve the final prediction block, thereby reducing residual values and bitrate needed to code the residual values.

In ITU-T H.266/Versatile Video Coding (VVC), blocks of pictures include "coding units" or "CUs." For inter-predicted CUs in VVC, a video coder may code motion parameters including motion vectors, reference picture indices and reference picture list usage index, and additional information needed for coding features of VVC to be used for inter-predicted sample generation. The motion parameters can be signalled in an explicit or implicit manner. When a CU is coded with skip mode, the CU is associated with one PU and has no significant residual coefficients, no coded motion vector delta or reference picture index. VVC specifies a merge mode, whereby the motion parameters for the current CU are obtained from neighbouring CUs, including spatial and temporal candidates, and additional schedules introduced in VVC. The merge mode can be applied to any inter-predicted CU, not only for skip mode. The alternative to merge mode is the explicit transmission of motion parameters, where motion vector, corresponding reference picture index for each reference picture list, and reference picture list usage flag, and other needed information are signalled explicitly for each CU.

Beyond the inter coding features in ITU-T H.265/High Efficiency Video Coding (HEVC), VVC includes a number of new and refined inter prediction coding tools listed as follows:
  Extended merge prediction
  Merge mode with MVD (MMVD)·
  Symmetric MVD (SMVD) signalling
  Affine motion compensated prediction
  Subblock-based temporal motion vector prediction (SbTMVP)
  Adaptive motion vector resolution (AMVR)
  Motion field storage: 1/16th luma sample MV storage and 8×8 motion field compression
  Bi-prediction with CU-level weight (BCW)
  Bi-directional optical flow (BDOF)
  Decoder side motion vector refinement (DMVR)
  Geometric partitioning mode (GPM)
  Combined inter and intra prediction (CIIP)

In the regular merge mode of VVC, a video coder constructs a merge candidate list to include the following five types of candidates, in order:
1. Spatial MVP from spatial neighbour CUs
2. Temporal MVP from collocated CUs
3. History-based MVP from an FIFO table
4. Pairwise average MVP
5. Zero MVs.

The size of the merge list is signalled in a sequence parameter set (SPS) header, and the maximum allowed size of merge list is 6, per VVC. For each CU code in merge mode, an index of best merge candidate is encoded using truncated unary binarization (TU). The derivation process of each category of merge candidates is provided in this session. As done in HEVC, VVC also supports parallel derivation of the merging candidate lists for all CUs within a certain size of area.

A new Enhanced Compression Model (ECM) is being developed under coordinated exploration study by the Joint Video Exploration Team (JVET) of ITU-T VCEG and ISO/IEC MPEG as a potential enhanced video coding technology beyond the capabilities of VVC.

In both VVC and ECM, a motion vector may point to a position that is out of the picture boundary(OOB), wherein the pixel values are generated by padding from the boundary pixels. In Chen et al., "AHG12: Enhanced bi-directional motion compensation," Joint Video Experts Team (JVET) of ITU-T SG 16 WP 3 and ISO/IEC JTC 1/SC 29, 25th Meeting, document no. JVET-Y0125, 12-21 Jan. 2022, (hereinafter, "JVET-Y0125"), when combining more than one prediction block generated by the motion compensation process, the OOB predictors are discarded and only the non-OOB predictors are used to generate the final predictor. To be specific, the positions of the predictors within the current block are denoted as $Pos\_x_{i,j}$ and $Pos\_y_{i,j}$. the MV of the current block are denoted as $Mv\_x_{i,j}^{Lx}$ and $Mv\_y_{i,j}^{Lx}$ (x could be 0 or 1 for list 0 and list1, respectively). $POS_{LeftBdry}$, $POS_{RightBdry}$, $POS_{TopBdry}$, $POS_{BottomBdry}$ are the positions of four boundaries of a picture. Since 1/16-pel MV is used in the ECM, all variables are denoted in the unit of the 1/16 sample and thus the value of half_pixel is set equal to 8.

Per JVET-Y0125, the predictor $P_{i,j}^{Lx}$ is regarded as OOB when at least one of the following conditions holds:

$(Pos\_x_{i,j}+Mv\_x_{i,j}^{Lx}) > (Pos_{RightBdry}+\text{half\_pixel})$, $(Pos\_x_{i,j}+Mv\_x_{i,j}^{Lx}) < (Pos_{LeftBdry}-\text{half\_pixel})$, $(Pos\_y_{i,j}+Mv\_y_{i,j}^{Lx}) > (POS_{BottomBdry}+\text{half\_pixel})$, or $(Pos\_y_{i,j}+Mv\_y_{i,j}^{Lx}) < (POS_{TopBdry}-\text{half\_pixel})$ Otherwise, when none of the above conditions holds, the predictor Pur is regarded as non-OOB.

After the OOB condition is determined for each predictor, the proposed scheme in JVET-Y0125 is applied to the bi-directional MC blocks to generate the final predictors where the following procedures are deployed. The same checking mechanism is also applied when BCW is enabled.

If $P_{i,j}^{L0}$ is OOB and $P_{i,j}^{L1}$ is non-OOB $P_{i,j}^{final} = P_{i,j}^{L1}$ else if $P_{i,j}^{L0}$ is non-OOB and $P_{i,j}^{L1}$ is OOB $P_{i,j}^{final} = P_{i,j}^{L0}$ else $P_{i,j}^{final} = (P_{i,j}^{L0} + P_{i,j}^{L1} + 1) \gg 1$ However, JVET-Y0125 does not provide method to prevent or reduce the occurrence of OOB MV. And it does not modify the input for the DMVR and BDOF process, wherein OOB predictor may be used.

This disclosure describes various techniques that may be applied to reduce the occurrence of OOB MVs and/or to improve the prediction generated by an OOB MV.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for coding video data using out-of-boundary motion vectors. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for coding video data using out-of-boundary motion vectors. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency(RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (cMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that code video data using out-of-boundary motion vectors.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary trec (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtrec partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component may be an array or single sample from one of the three arrays (luma and two chroma) for a picture in 4:2:0, 4:2:2, or 4:4:4 color format, or an array or a single sample of the array for a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value.

The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

According to the techniques of this disclosure, video encoder 200 and video decoder 300 may be configured to perform decoder-side motion vector refinement (DMVR) using various techniques. While video encoder 200 is generally configured to encode video data, video encoder 200 also decodes encoded video data (i.e., reconstructs the video data) for use as reference data when encoding subsequent video data. Thus, video encoder 200 may also be configured to perform the DMVR techniques of this disclosure, such that motion vectors and reference data used by video encoder 200 are also available to video decoder 300.

As one example, video encoder 200 and video decoder 300 may be configured to perform bi-directional optical flow (BDOF) techniques to refine motion vectors. As discussed in greater detail below, BDOF generally involves per-sub-block or per-sample refinement to motion vectors using neighboring samples to reference samples identified by the original motion vectors. In some cases, one or more of the neighboring samples may be outside of the reference picture boundary, e.g., when a reference block is adjacent to or overlaps the reference picture boundary.

According to the techniques of this disclosure, in some examples, when refining motion information for a particular sample of a final prediction block (e.g., individually for the sample or as part of a sub-block of a parent block), video encoder 200 and video decoder 300 may determine whether a predictor for the sample is outside of a reference picture boundary, also referred to as being out-of-bounds (OOB). If a first predictor is OOB and a second predictor is not OOB, the value of the first predictor may be set equal to the value of the second predictor. Video encoder 200 or video decoder 300 may then perform BDOF using the first and second predictors, which will have equal values in this case.

In this manner, video encoder 200 and video decoder 300 may perform BDOF even when one or more predictors are OOB. Thus, the final predictor value may more accurately reflect the block than a prediction block formed with unrefined motion vectors. As such, a residual block (that is, a block including sample-by-sample differences between the current block and the prediction block) may have smaller values to be encoded. This results in fewer bits in the bitstream being used to encode the residual block, thereby reducing the overall bitrate of the bitstream including the video data. In this manner, these techniques may improve the field of video coding and the performance of video encoder 200, video decoder 300, and intermediate devices between source device 102 and destination device 116, e.g., intermediate network devices, because an overall bandwidth needed to transport the video data may be reduced.

Additionally or alternatively, when forming a motion vector, video encoder 200 or video decoder 300 may determine whether the motion vector refers to an area of a reference picture that is partially or entirely outside of a boundary of the reference picture. When the motion vector refers to an area outside of the boundary of the reference picture, video encoder 200 or video decoder 300 may modify the motion vector to form a motion vector that refers to a portion of the reference picture that is entirely within the boundary of the reference picture. Video encoder 200 or video decoder 300 may use this motion vector to predict a corresponding block. Moreover, video encoder 200 or video decoder 300 may store the modified motion vector for the block for use as a candidate motion vector when subsequently predicting motion information of neighboring blocks to the block.

Additionally or alternatively, video encoder 200 or video decoder 300 may further determine whether a bi-directionally predicted block includes motion vectors that refer to reference blocks that are fully within corresponding reference pictures. In the case that at least one of the motion vectors refers to an OOB area, video encoder 200 or video decoder 300 may avoid using bi-directional prediction and instead may use uni-directional prediction. On the other hand, if both motion vectors refer to non-OOB areas, video encoder 200 or video decoder 300 may proceed to perform bi-directional prediction, including combining prediction blocks formed from the respective motion vectors.

Additionally or alternatively, video encoder 200 or video decoder 300 may perform prediction refinement with optical flow (PROF). As part of PROF, video encoder 200 or video decoder 300 may calculate gradient values for samples of prediction blocks generated using motion vectors. If a sample has a motion vector that points to a position outside of a reference picture boundary, video encoder 200 or video decoder 300 may set the corresponding gradient for that sample equal to zero.

Additionally or alternatively, video encoder 200 or video decoder 300 may perform combined intra- and inter-prediction (CIIP) to form a prediction block for a block of video data. As part of CIIP, video encoder 200 or video decoder 300 may generate both an intra-prediction block and an inter-prediction block, then combine the intra-prediction block and the inter-prediction block to form the final prediction block. However, in some examples, motion information for generating the inter-prediction block may refer to an OOB area for a reference picture. In such a case, video encoder 200 or video decoder 300 may discard the inter-prediction block and instead treat the intra-prediction block as the final prediction block for the block of video data. Alternatively, video encoder 200 or video decoder 300 may use the inter-prediction block, but weight the values of the inter-prediction block less than if the inter-prediction block were generated using portions of reference pictures that are entirely within the bounds of the corresponding reference pictures.

Additionally or alternatively, video encoder 200 and video decoder 300 may be configured to code motion information for a block using merge mode. When coding motion information using merge mode, video encoder 200 and video decoder 300 may form a merge candidate list including motion information for spatial and/or temporal neighboring blocks to the block. According to the techniques of this disclosure, when forming the merge candidate list, video encoder 200 and video decoder 300 may be configured to skip addition of a candidate motion vector to the merge candidate list if one or more of: the candidate is a uni-prediction candidate that refers to a reference block that is entirely OOB, the candidate is a uni-prediction candidate that refers to a reference block that is partially OOB, the candidate is a bi-prediction candidate and both reference blocks are entirely OOB, or the candidate is a bi-prediction candidate and at least a portion of one or both reference blocks is OOB.

Figure 2:
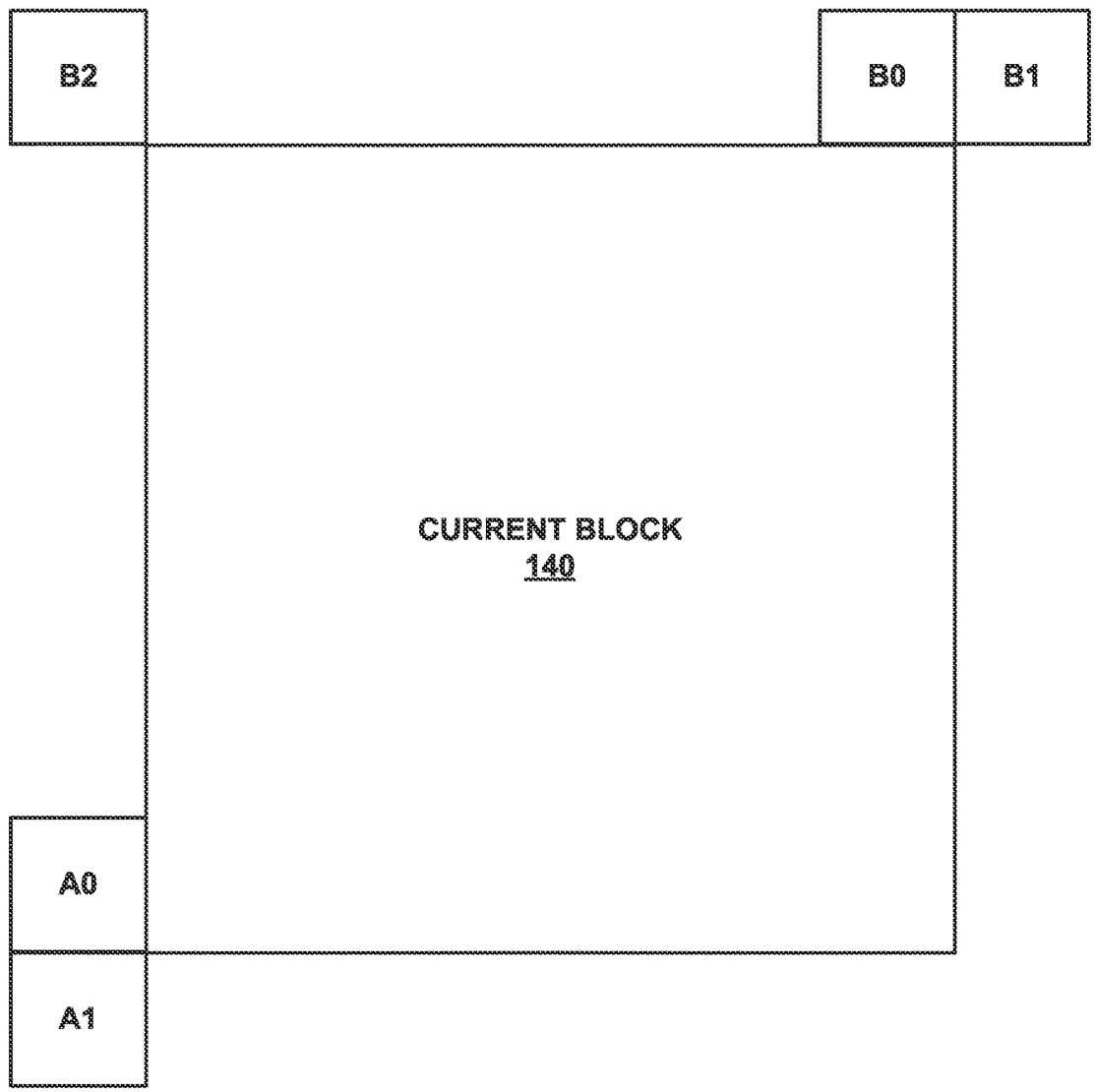
FIG. 2 is a conceptual diagram illustrating positions of spatial merge candidates for motion vector prediction.

FIG. 2 is a conceptual diagram illustrating positions of spatial merge candidates for motion vector prediction. In particular, FIG. 2 depicts spatial neighboring blocks A0, A1, B0, B1, and B2 to current block 140. The derivation of spatial merge candidates in VVC is same to that in HEVC except the positions of first two merge candidates are swapped. A maximum of four merge candidates are selected among candidates located in the positions depicted in FIG. 2. The order of derivation, according to VVC, is B0, A0, B1, A1 and B2. Per VVC, position B2 is considered only when one or more than one CUs of position B0, A, B1, A1 are not available (e.g., because it belongs to another slice or tile) or is intra coded. After candidate at position A1 is added, the addition of the remaining candidates is subject to a redundancy check which ensures that candidates with same motion information are excluded from the list so that coding efficiency can be improved.

Figure 3:
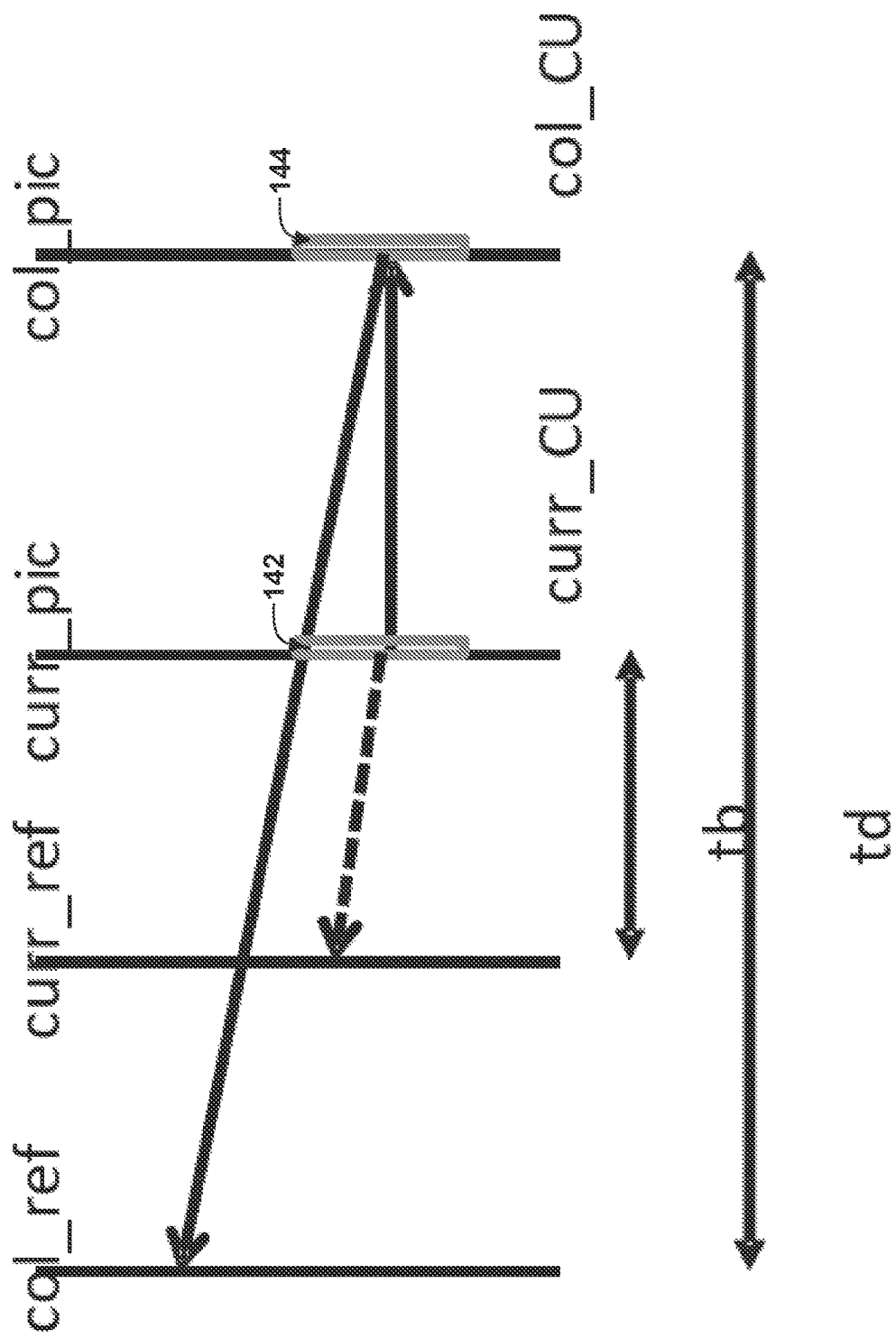
FIG. 3 is a conceptual diagram illustrating an example of motion vector scaling for a temporal merge candidate.

FIG. 3 is a conceptual diagram illustrating an example of motion vector scaling for a temporal merge candidate. In particular, in this example, motion information for a current CU 142 may be predicted using motion information of collocated CU 144. A video coder may add a temporal merge candidate to the merge candidate list according to temporal motion vector prediction (TMVP). In the derivation of this temporal merge candidate, the video coder may derive a scaled motion vector based on collocated CU 144 belonging to the collocated reference picture. The reference picture list to be used for derivation of the co-located CU is explicitly signaled in the slice header. The scaled motion vector for temporal merge candidate is obtained as illustrated by the dotted line in FIG. 3, which is scaled from the motion vector of the co-located CU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero.

Figure 4:
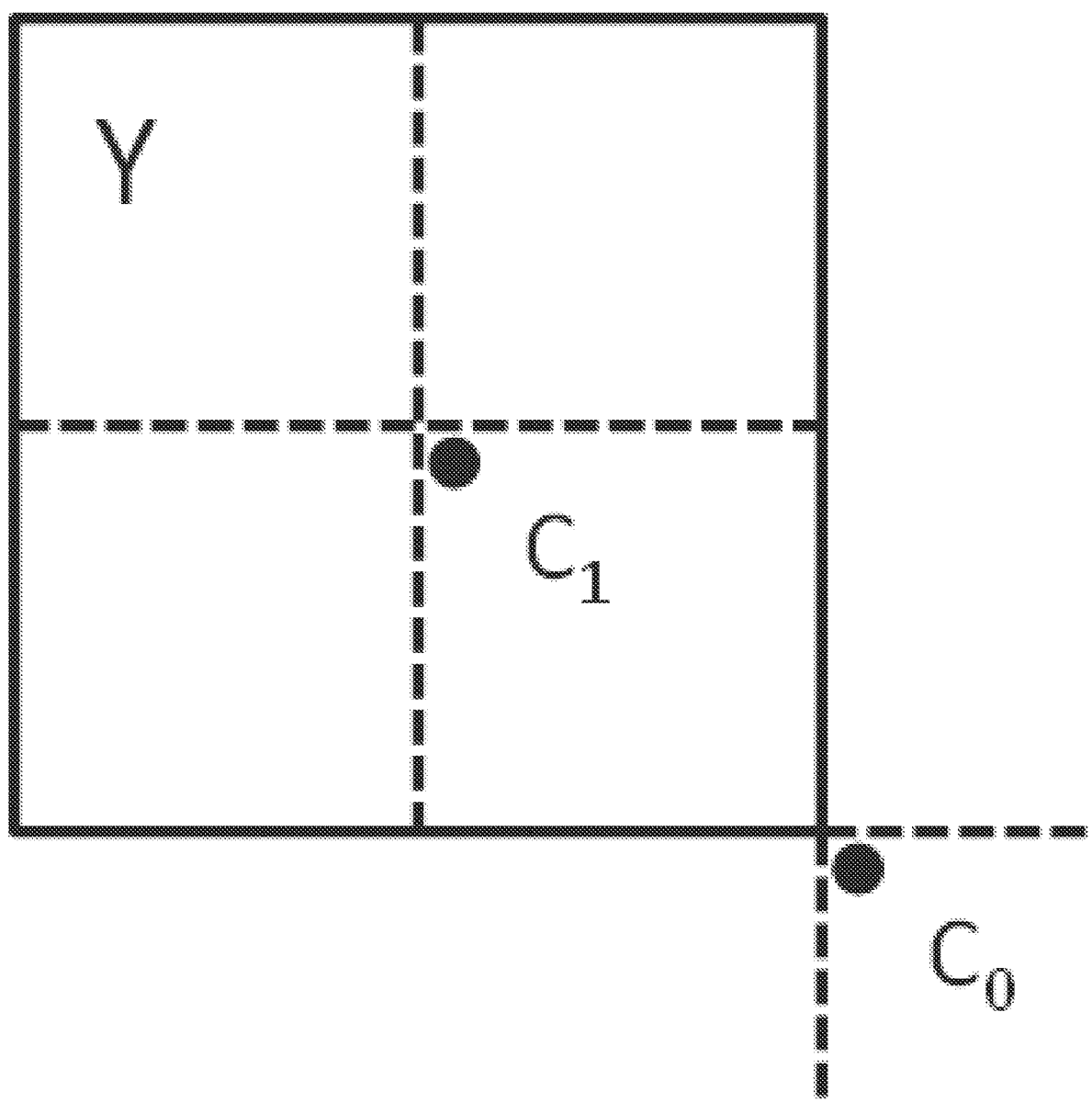
FIG. 4 is a conceptual diagram illustrating example candidate positions for temporal merge candidates.

FIG. 4 is a conceptual diagram illustrating example candidate positions for temporal merge candidates. The video coder may select the position for the temporal candidate between candidates C0 and C1, as depicted in FIG. 4, per VVC. If the CU at position C0 is not available, is intra coded, or is outside of the current row of CTUS, position C1 is used. Otherwise, position C0 is used in the derivation of the temporal merge candidate.

History-based motion vector prediction (HMVP) merge candidates may be added to the merge list after the spatial MVP and TMVP candidates. In the HMVP techniques, the motion information of a previously coded block may be stored in a table and used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate.

In VVC, the HMVP table size S is set to be 6, which indicates up to 6 History-based MVP (HMVP) candidates may be added to the table. When inserting a new motion candidate to the table, a constrained first-in-first-out (FIFO) rule is utilized wherein redundancy check is firstly applied to find whether there is an identical HMVP in the table. If found, the identical HMVP is removed from the table and all the HMVP candidates afterwards are moved forward.

HMVP candidates could be used in the merge candidate list construction process. The latest several HMVP candidates in the table are checked in order and inserted to the candidate list after the TMVP candidate. A redundancy check may be applied on the HMVP candidates to the spatial or temporal merge candidate.

To reduce the number of redundancy check operations, the following simplifications may be used. First, a number of HMPV candidates used for merge list generation may be set as (N<=4)?M: (8-N), wherein N indicates number of existing candidates in the merge list and M indicates number of available HMVP candidates in the table. Second, after the total number of available merge candidates reaches the maximally allowed merge candidates minus 1, the merge candidate list construction process from HMVP may be terminated.

Pairwise average merge candidates may be generated through averaging predefined pairs of candidates in the existing merge candidate list. The predefined pairs may be defined as {(0, 1), (0, 2), (1, 2), (0, 3), (1.3), (2, 3)}, where the numbers denote the merge indices to the merge candidate list. The averaged motion vectors may be calculated separately for each reference list. If both motion vectors are available in one list, these two motion vectors may be averaged even when they point to different reference pictures. If only one motion vector is available, use the one directly; if no motion vector is available, keep this list invalid. When the merge list is not full after pair-wise average merge candidates are added, zero MVPs may be inserted at the end, until the maximum merge candidate number is reached.

Figure 5:
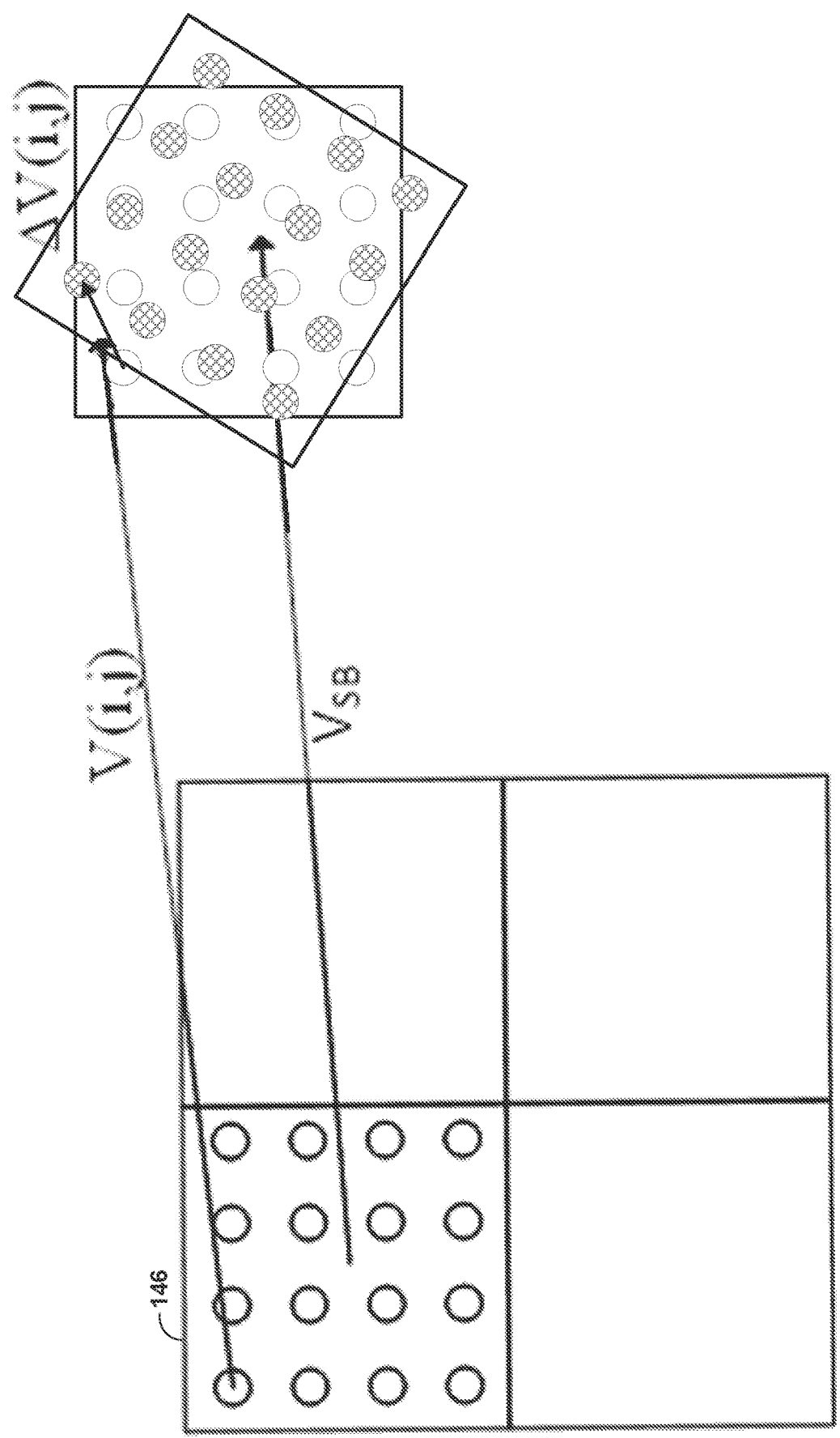
FIG. 5 is a conceptual diagram illustrating an example sub-block motion vector and pixel location difference.

FIG. 5 is a conceptual diagram illustrating an example sub-block motion vector and pixel location difference. In particular, sub-block 146 may be predicted using affine motion compensation. Subblock based affine motion compensation can save memory access bandwidth and reduce computation complexity compared to pixel-based motion compensation, at the cost of a prediction accuracy penalty. To achieve a finer granularity of motion compensation, prediction refinement with optical flow (PROF) is used to refine the subblock based affine motion compensated prediction without increasing the memory access bandwidth for motion compensation. In VVC, after the subblock based affine motion compensation is performed, luma prediction sample is refined by adding a difference derived by the optical flow equation. The PROF is described as following four steps:

Step 1—The subblock-based affine motion compensation is performed to generate subblock prediction I (i,j).

Step 2—The spatial gradients $g_x$ (i,j) and $g_y$ (i,j) of the subblock prediction are calculated at each sample location using a 3-tap filter [−1, 0, 1]. The gradient calculation may be the same as gradient calculation in BDOF.

$$g_x(i,j)=(I(i+1,j)\gg \text{shift1})-(I(i-1,j)\gg \text{shift1})$$

$$g_y(i,j)=(I(i,j+1)\gg \text{shift1})-(I(i,j-1)\gg \text{shift1})$$

shift1 may be used to control the gradient's precision. The subblock (i.e., 4×4) prediction is extended by one sample on each side for the gradient calculation. To avoid additional memory bandwidth and additional interpolation computation, those extended samples on the extended borders are copied from the nearest integer pixel position in the reference picture.

Step 3—The luma prediction refinement is calculated according to the following optical flow equation:

$$\Delta I(i,j)=g_x(i,j)*\Delta v_x(i,j)+g_y(i,j)*\Delta v_y(i,j)$$

where the $\Delta v(i,j)$ is the difference between sample MV computed for sample location (i,j), denoted by v(i,j), and the subblock MV of the subblock to which sample (i,j) belongs, as shown in FIG. 5. The $\Delta v(i,j)$ is quantized in the unit of 1/32 luma sample precision.

Since the affine model parameters and the sample location relative to the subblock center are not changed from subblock to subblock, $\Delta v(i,j)$ can be calculated for the first subblock, and reused for other subblocks in the same CU. Let dx (i,j) and dy(i,j) be the horizontal and vertical offset from the sample location (i,j) to the center of the subblock $(x_{SB}, y_{SB})$, $\Delta v(x, y)$ can be derived by the following equation:

$$\begin{cases} dx(i, j) = i - x_{SB} \\ dy(i, j) = j - y_{SB} \end{cases}$$

$$\begin{cases} \Delta v_x(i, j) = C * dx(i, j) + D * dy(i, j) \\ \Delta v_y(i, j) = E * dx(i, j) + F * dy(i, j) \end{cases}$$

In order to keep accuracy, the enter of the subblock $(x_{SB}, y_{SB})$ is calculated as $((W_{SB}-1)/2, (H_{SB}-1)/2)$, where $W_{SB}$ and $H_{SB}$ are the subblock width and height, respectively.

For 4-parameter affine model, $$\begin{cases} C = F = \frac{v_{1x} - v_{0x}}{w} \\ E = -D = \frac{v_{1y} - v_{0y}}{w} \end{cases}$$

For 6-parameter affine model, $$\begin{cases} C = \frac{v_{1x} - v_{0x}}{w} \\ D = \frac{v_{2x} - v_{0x}}{h} \\ E = \frac{v_{1y} - v_{0y}}{w} \\ F = \frac{v_{2y} - v_{0y}}{h} \end{cases}$$

In the examples above, $(v_{0x}, v_{0y})$, $(v_{1x}, v_{1y})$, $(v_{2x}, v_{2y})$ are the top-left, top-right and bottom-left control point motion vectors, w and h are the width and height of the CU.

Step 4-Finally, the luma prediction refinement $\Delta I(i,j)$ is added to the subblock prediction I(i,j). The final prediction I′ is generated as the following equation:

$$I'(i,j)=I(i,j)+\Delta I(i,j)$$

VVC includes a bi-prediction with CU-level weight (BCW) technique, which is summarized as follows. In HEVC, the bi-prediction signal is generated by averaging two prediction signals obtained from two different reference pictures and/or using two different motion vectors. In VVC, the bi-prediction mode is extended beyond simple averaging to allow weighted averaging of the two prediction signals:

$$P_{bi-pred}=((8-w)*P_0+w*P_1+4)\gg 3$$

Five weights are allowed in the weighted averaging bi-prediction, w ∈ {-2, 3, 4, 5, 10}. For each bi-predicted CU, the weight w is determined in one of two ways: 1) for a non-merge CU, the weight index is signalled after the motion vector difference; 2) for a merge CU, the weight index is inferred from neighbouring blocks based on the merge candidate index. BCW is only applied to CUs with 256 or more luma samples (i.e., CU width times CU height is greater than or equal to 256). For low-delay pictures, all 5 weights are used. For non-low-delay pictures, only 3 weights (w∈ {3,4,5}) are used:

At video encoder 200, fast search algorithms are applied to find the weight index without significantly increasing the encoder complexity. These algorithms are summarized as follows. Further details are discussed in the VTM software and document Su et al., "CE4-related: Generalized bi-prediction improvements combined from JVET-L0197 and JVET-L0296," JVET WG 05 MPEG Joint Video Coding Team(s) with ITU-T SG 16, document no. JVET-L0646, Oct. 8, 2018 (hereinafter, "JVET-L0646"). When combined with AMVR, unequal weights are only conditionally checked for 1-pel and 4-pel motion vector precisions if the current picture is a low-delay picture.

When combined with affine, affine ME will be performed for unequal weights if and only if the affine mode is selected as the current best mode.

When the two reference pictures in bi-prediction are the same, unequal weights are only conditionally checked.

Unequal weights are not searched when certain conditions are met, depending on the POC distance between current picture and its reference pictures, the coding QP, and the temporal level.

The BCW weight index is coded using one context coded bin followed by bypass coded bins. The first context coded bin indicates if equal weight is used; and if unequal weight is used, additional bins are signalled using bypass coding to indicate which unequal weight is used.

Weighted prediction (WP) is a coding tool supported by the H.264/AVC and HEVC standards to efficiently code video content with fading. Support for WP was also added into the VVC standard. WP allows weighting parameters (weight and offset) to be signalled for each reference picture in each of the reference picture lists L0 and L1. Then, during motion compensation, the weight(s) and offset(s) of the corresponding reference picture(s) are applied. WP and BCW are designed for different types of video content. In order to avoid interactions between WP and BCW, which will complicate VVC decoder design, if a CU uses WP, then the BCW weight index is not signalled, and w is inferred to be 4 (i.e., equal weight is applied). For a merge CU, the weight index is inferred from neighbouring blocks based on the merge candidate index. This can be applied to both normal merge mode and inherited affine merge mode. For constructed affine merge mode, the affine motion information is constructed based on the motion information of up to 3 blocks. The BCW index for a CU using the constructed affine merge mode is simply set equal to the BCW index of the first control point MV.

In VVC, CIIP and BCW cannot be jointly applied for a CU. When a CU is coded with CIIP mode, the BCW index of the current CU is set to 2, e.g., equal weight.

Figure 6:
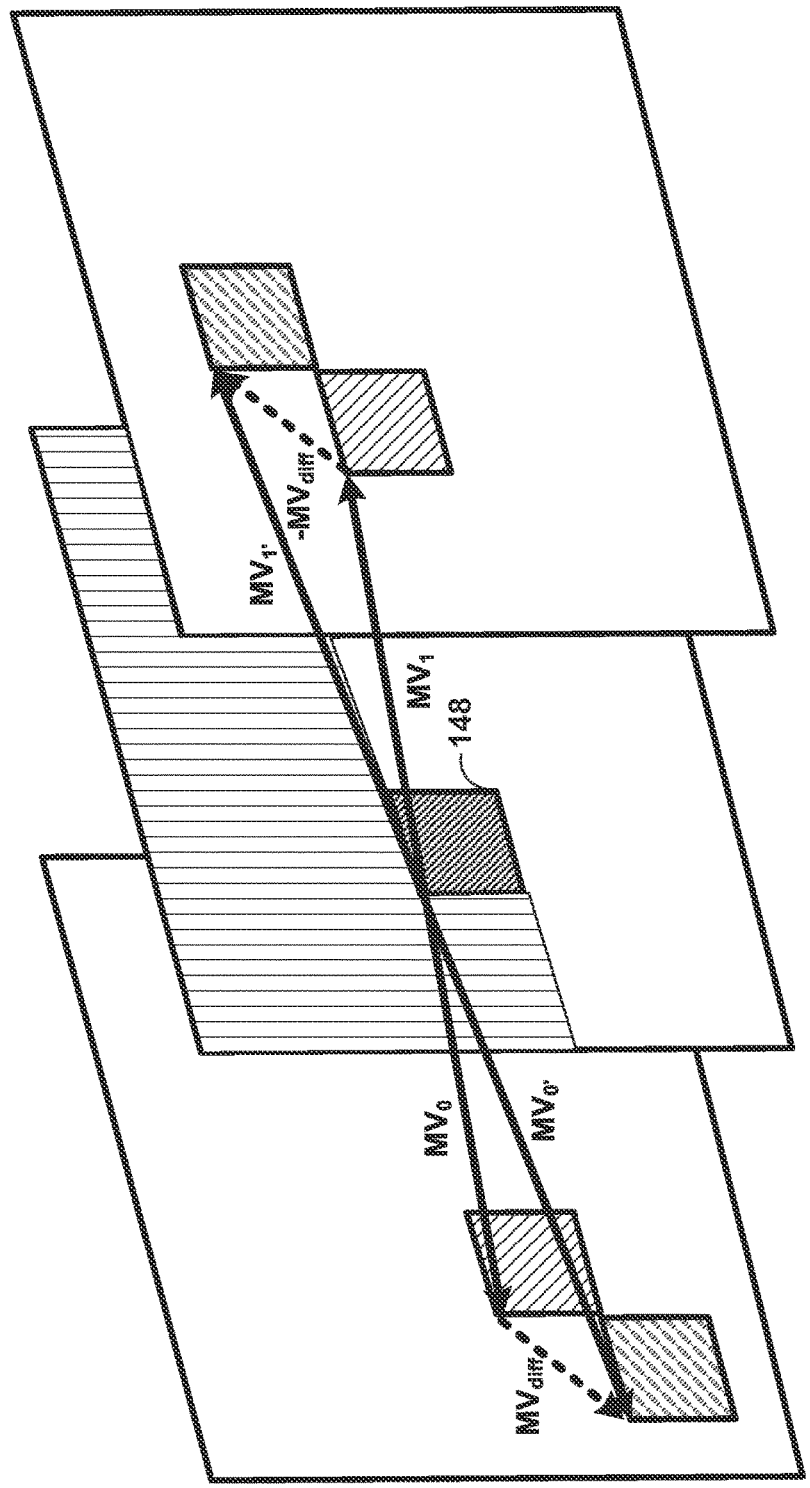
FIG. 6 is a conceptual diagram illustrating an example of bilateral matching.

FIG. 6 is a conceptual diagram illustrating an example of bilateral matching. Bilateral matching may be used for decoder-side motion vector refinement in VVC for current block 148. In VVC, the bilateral-matching based decoder side motion vector refinement (DMVR) is applied to increase the accuracy of the MVs of a bi-prediction merge candidate. The BM method calculates the SAD between the two candidate blocks in the reference picture list L0 and list L1. As illustrated in FIG. 6, the sum of absolute difference (SAD) between the shaded blocks based on each MV candidate around the initial MV is calculated. The MV candidate with the lowest SAD becomes the refined MV and used to generate the bi-predicted signal. The SAD of the initial MVs is subtracted by ¼ of the SAD value to serve as regularization term. The temporal distances (i.e., Picture Order Count (POC) difference) from two reference pictures to the current picture shall be the same. Therefore, the MVD0 is just the opposite sign of MVD1.

The refinement search range is two integer luma samples from the initial MV. The searching includes the integer sample offset search stage and fractional sample refinement stage. 25 points full search is applied for integer sample offset searching. The SAD of the initial MV pair is first calculated. If the SAD of the initial MV pair is smaller than a threshold, the integer sample stage of DMVR is terminated. Otherwise SADs of the remaining 24 points are calculated and checked in raster scanning order. The point with the smallest SAD is selected as the output of integer sample offset searching stage.

The integer sample search is followed by fractional sample refinement. To save the calculational complexity, the fractional sample refinement is derived by using parametric error surface equation, instead of additional search with SAD comparison. The fractional sample refinement is conditionally invoked based on the output of the integer sample search stage. When the integer sample search stage is terminated with center having the smallest SAD in either the first iteration or the second iteration search, the fractional sample refinement is further applied.

In parametric error surface based sub-pixel offsets estimation, the center position cost and the costs at four neighboring positions from the center are used to fit a 2-D parabolic error surface equation of the following form $$E(x,y)=A(x-x_{min})^2+B(y-y_{min})^2+C \qquad (1)$$

where $(x_{min}, y_{min})$ corresponds to the fractional position with the least cost and C corresponds to the minimum cost value. By solving the above equations by using the cost value of the five search points, the $(x_{min}, y_{min})$ is computed as:

$$x_{min}=(E(-1,0)-E(1,0))/(2(E(-1,0)+E(1,0)-2E(0,0))) \qquad (2)$$

$$y_{min}=(E(0,-1)-E(0,1))/(2((E(0,-1)+E(0,1)-2E(0,0))) \qquad (3)$$

The value of $x_{min}$ and $y_{min}$ are automatically constrained to be between −8 and 8 since all cost values are positive and the smallest value is E(0,0). This corresponds to half peal offset with 1/16th-pel MV accuracy in VVC. The computed fractional $(x_{min}, y_{min})$ are added to the integer distance refinement MV to get the sub-pixel accurate refinement delta MV.

In VVC, the resolution of the MVs is 1/16 luma samples. The samples at the fractional position are interpolated using a 8-tap interpolation filter. In DMVR, the search points are surrounding the initial fractional-pel MV with integer sample offset, therefore the samples of those fractional position need to be interpolated for DMVR search process. To reduce the calculation complexity, the bi-linear interpolation filter is used to generate the fractional samples for the searching process in DMVR. Another important effect is that by using bi-linear filter is that with 2-sample search range, the DVMR does not access more reference samples compared to the normal motion compensation process. After the refined MV is attained with DMVR search process, the normal 8-tap interpolation filter is applied to generate the final prediction. In order to not access more reference samples to normal MC process, the samples, which is not needed for the interpolation process based on the original MV but is needed for the interpolation process based on the refined MV, will be padded from those available samples.

When the width and/or height of a CU are larger than 16 luma samples, it will be further split into subblocks with width and/or height equal to 16 luma samples for the DMVR process.

Figure 7:
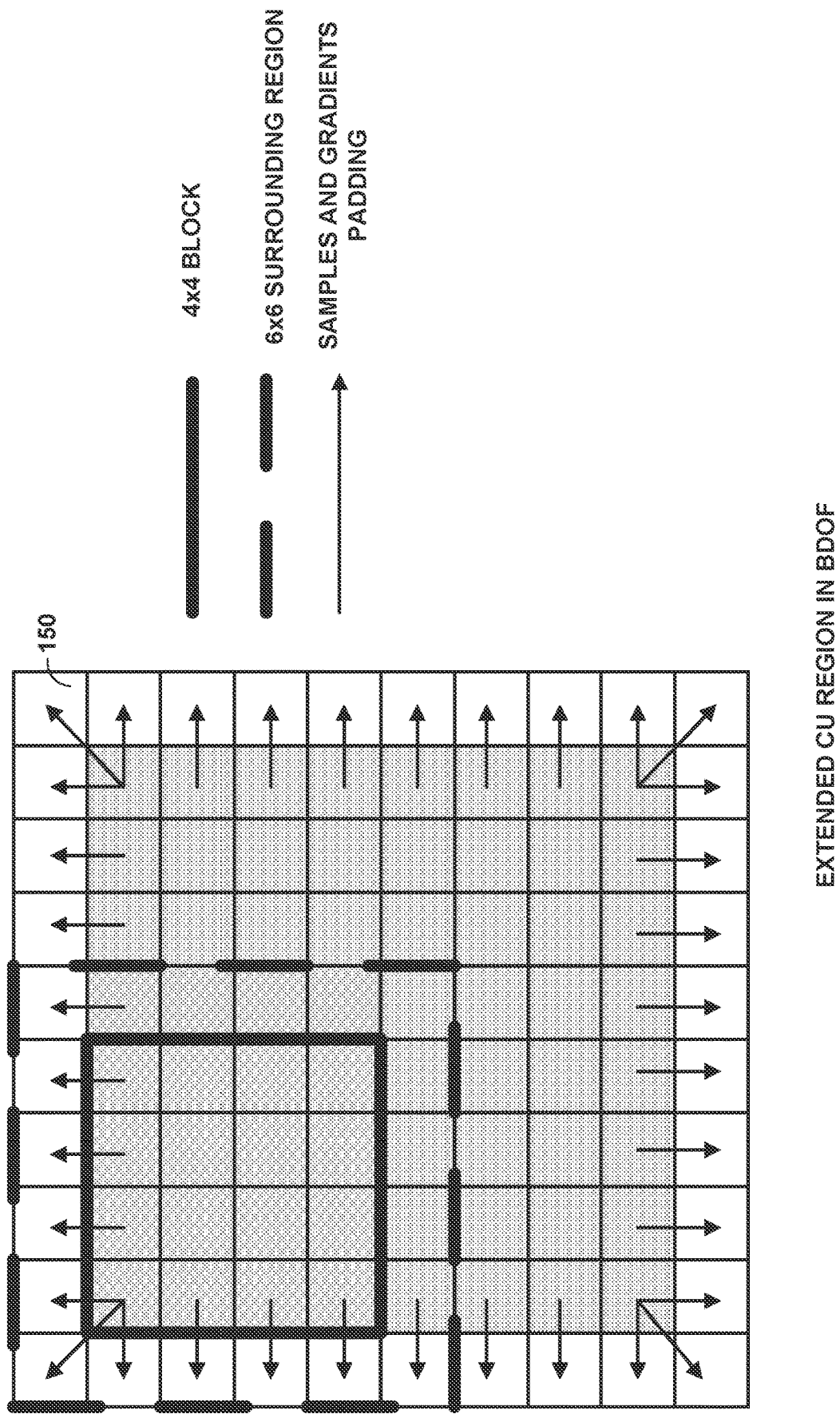
FIG. 7 is a conceptual diagram illustrating an example of an extended coding unit (CU) region using bi-directional optical flow (BDOF).

In VVC, the DMVR can be applied for the CUs which are coded with following modes and features:
CU level merge mode with bi-prediction MV
One reference picture is in the past and another reference picture is in the future with respect to the current picture
The distances (i.e., POC difference) from two reference pictures to the current picture are same
Both reference pictures are short-term reference pictures
CU has more than 64 luma samples
Both CU height and CU width are larger than or equal to 8 luma samples
BCW weight index indicates equal weight
WP is not enabled for the current block
CIIP mode is not used for the current block FIG. 7 is a conceptual diagram illustrating an example of an extended coding unit (CU) region 150 using bi-directional optical flow (BDOF). BDOF may be used to refine the bi-prediction signal of luma samples in a CU at the 4×4 sub-block level. As its name indicates, the BDOF mode is based on the optical flow concept, which assumes that the motion of an object is smooth. For each 4×4 sub-block, a motion refinement $(v_x, v_y)$ is calculated by minimizing the difference between the L0 and L1 prediction samples. The motion refinement is then used to adjust the bi-predicted sample values in the 4×4 sub-block. The following steps are applied in the BDOF process.

First, the horizontal and vertical gradients, $$\frac{\partial I^{(k)}}{\partial x}(i, j)$$

and $$\frac{\partial I^{(k)}}{\partial y}(i, j), k = 0, 1,$$

of the two prediction signals are computed by directly calculating the difference between two neighboring samples, i.e., $$\frac{\partial I^{(k)}}{\partial x}(i, j) = \left(I^{(k)}(i+1, j) \gg \text{shift1}\right) - \left(I^{(k)}(i-1, j) \gg \text{shift1}\right) \quad (1\text{-}6\text{-}1)$$

$$\frac{\partial I^{(k)}}{\partial y}(i, j) = \left(I^{(k)}(i, j+1) \gg \text{shift1}\right) - \left(I^{(k)}(i, j-1) \gg \text{shift1}\right)$$

where $I^{(k)}(i,j)$ are the sample value at coordinate $(i,j)$ of the prediction signal in list k, k=0,1, and shift1 is calculated based on the luma bit depth, bitDepth, as shift1 is set to be equal to 6.

Then, the auto- and cross-correlation of the gradients, $S_1$, $S_2$, $S_3$, $S_5$ and $S_6$, are calculated as $$S_1 = \Sigma_{(i,j) \in \Omega} |\psi_x(i,j)|, S_3 = \Sigma_{(i,j) \in \Omega} \theta(i,j) \cdot (-\text{sign}(\psi_x(i,j)))$$

$$S_2 = \Sigma_{(i,j) \in \Omega} \psi_x(i,j) \cdot \text{sign}(\psi_x(i,j)) \quad (1\text{-}6\text{-}2)$$

$$S_5 = \Sigma_{(i,j) \in \Omega} |\psi_y(i,j)|, S_6 = \Sigma_{(i,j) \in \Omega} \theta(i,j) \cdot (-\text{sign}(\psi_y(i,j)))$$

where $$\psi_x(i, j) = \left(\frac{\partial I^{(1)}}{\partial x}(i, j) + \frac{\partial I^{(0)}}{\partial x}(i, j)\right) \gg \text{shift3} \quad (1\text{-}6\text{-}3)$$

$$\psi_y(i, j) = \left(\frac{\partial I^{(1)}}{\partial y}(i, j) + \frac{\partial I^{(0)}}{\partial y}(i, j)\right) \gg \text{shift3}$$

$$\theta(i, j) = \left(I^{(0)}(i, j) \gg \text{shift2}\right) - \left(I^{(1)}(i, j) \gg \text{shift2}\right)$$

where $\Omega$ is a 6×6 window around the 4×4 sub-block, the value of shift2 is set to be equal to 4, and the value of shift3 is set to be equal to 1.

The motion refinement $(v_x, v_y)$ is then derived using the cross- and auto-correlation terms using the following:

$$v_x = S_1 > 0 ? \text{clip3}(-th'_{BIO}, th'_{BIO}, -((S_3 \ll 2) \gg \lfloor \log_2 S_1 \rfloor)) : 0 \quad (1\text{-}6\text{-}4)$$

$$v_y = s_5 > 0 ? \text{clip3}(-th'_{BIO}, th'_{BIO}, -(((s_6 \ll 2) - ((v_x \cdot s_2) \gg 1)) \gg \lfloor \log_2 s_5 \rfloor)) : 0$$

where, $th'_{BIO} = 4$. $\lfloor \cdot \rfloor$ is the floor function.

Based on the motion refinement and the gradients, the following adjustment is calculated for each sample in the 4×4 sub-block:

$$b(x, y) = v_x \cdot \left(\frac{\partial I^{(1)}(x, y)}{\partial x} - \frac{\partial I^{(0)}(x, y)}{\partial x}\right) + v_y \cdot \left(\frac{\partial I^{(1)}(x, y)}{\partial y} - \frac{\partial I^{(0)}(x, y)}{\partial y}\right) \quad (1\text{-}6\text{-}5)$$

Finally, the BDOF samples of the CU are calculated by adjusting the bi-prediction samples as follows:

$$\text{pred}_{BDOF}(x,y) = (I^{(0)}(x,y) + I^{(1)}(x,y) + b(x,y) + o_{\text{offset}}) \gg \text{shift5} \quad (1\text{-}6\text{-}6)$$

where shift5 is set equal to Max(3, 15—BitDepth) and the variable $o_{\text{offset}}$ is set equal to $(1 \ll (\text{shift5}-1))$.

These values are selected such that the multipliers in the BDOF process do not exceed 15-bit, and the maximum bit-width of the intermediate parameters in the BDOF process is kept within 32-bit.

In order to derive the gradient values, some prediction samples $I^{(k)}(i,j)$ in list k (k=0,1) outside of the current CU boundaries need to be generated. As depicted in FIG. 7, the BDOF uses one extended row/column around the CU's boundaries. In order to control the computational complexity of generating the out-of-boundary prediction samples, prediction samples in the extended area (white positions) are generated by taking the reference samples at the nearby integer positions (using floor( ) operation on the coordinates) directly without interpolation, and the normal 8-tap motion compensation interpolation filter is used to generate prediction samples within the CU (gray positions). These extended sample values are used in gradient calculation only. For the remaining steps in the BDOF process, if any sample and gradient values outside of the CU boundaries are needed, they are padded (i.e., repeated) from their nearest neighbors.

Figure 8:
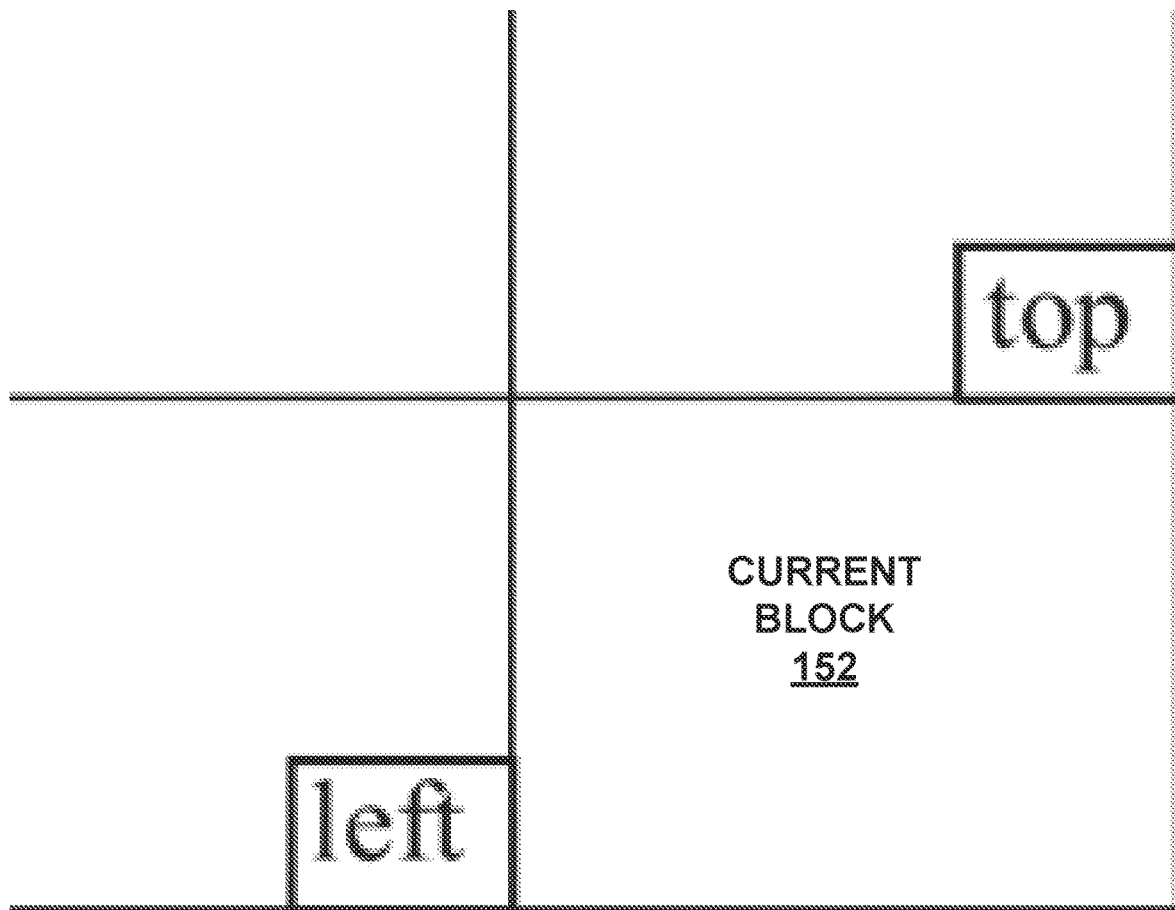
FIG. 8 is a conceptual diagram illustrating top and left-neighboring blocks used in combined inter- and intra-prediction (CIIP) weight derivation.

BDOF may be used to refine the bi-prediction signal of a CU at the 4×4 subblock level. BDOF is applied to a CU if it satisfies all the following conditions:

The CU is coded using "true" bi-prediction mode, i.e., one of the two reference pictures is prior to the current picture in display order and the other is after the current picture in display order The CU is not coded using affine mode or the SbTMVP merge mode CU has more than 64 luma samples Both CU height and CU width are larger than or equal to 8 luma samples BCW weight index indicates equal weight WP is not enabled for the current CU CIIP mode is not used for the current CU FIG. 8 is a conceptual diagram illustrating top and left-neighboring blocks used in combined inter- and intra-prediction (CIIP) weight derivation. In VVC, when a CU, such as current block 152, is coded in merge mode, if the CU contains at least 64 luma samples (that is, CU width times CU height is equal to or larger than 64), and if both CU width and CU height are less than 128 luma samples, an additional flag is signalled to indicate if the combined inter/intra prediction (CIIP) mode is applied to the current CU. As its name indicates, the CIIP prediction combines an inter prediction signal with an intra prediction signal. The inter prediction signal in the CIIP mode Pinter is derived using the same inter prediction process applied to regular merge mode; and the intra prediction signal $P_{intra}$ is derived following the regular intra prediction process with the planar mode. Then, the intra and inter prediction signals are combined using weighted averaging, where the weight value is calculated depending on the coding modes of the top and left neighbouring blocks (depicted in FIG. 8) as follows:

If the top neighbor is available and intra coded, then set isIntraTop to 1, otherwise set isIntraTop to 0;
If the left neighbor is available and intra coded, then set isIntraLeft to 1, otherwise set isIntraLeft to 0;
If (isIntraLeft+isIntraTop) is equal to 2, then wt is set to 3;
Otherwise, if (isIntraLeft+isIntraTop) is equal to 1, then wt is set to 2;
Otherwise, set wt to 1.
The CIIP prediction may be formed as follows:

$$P_{CIIP}=((4-wt)*P_{inter}+wt*P_{intra}+2)\gg 2$$

Local illumination compensation (LIC) is an inter prediction technique to model local illumination variation between current block and its prediction block as a function of that between current block template and reference block template. The parameters of the function can be denoted by a scale $\alpha$ and an offset $\beta$, which forms a linear equation, that is, $\alpha*p[x]+\beta$ to compensate illumination changes, where p[x] is a reference sample pointed to by MV at a location x on reference picture. Since $\alpha$ and $\beta$ can be derived based on current block template and reference block template, no signaling overhead is required for them, except that an LIC flag is signaled for AMVP mode to indicate the use of LIC.

The local illumination compensation (LIC) techniques proposed in Seregin et al., "CE4-3.1a and CE4-3.1b: Unidirectional local illumination compensation with affine prediction," JVET WG 05 MPEG Joint Video Coding Team(s) with ITU-T SG 16, document no. JVET-O0066, Jun. 18, 2019 (hereinafter, "JVET-O0066") may be used for uni-prediction inter CUs with the following modifications:

Intra neighbor samples can be used in LIC parameter derivation;
LIC is disabled for blocks with less than 32 luma samples;
For both non-subblock and affine modes, LIC parameter derivation is performed based on the template block samples corresponding to the current CU, instead of partial template block samples corresponding to first top-left 16×16 unit;
Samples of the reference block template are generated by using MC with the block MV without rounding it to integer-pel precision.

Figure 9:
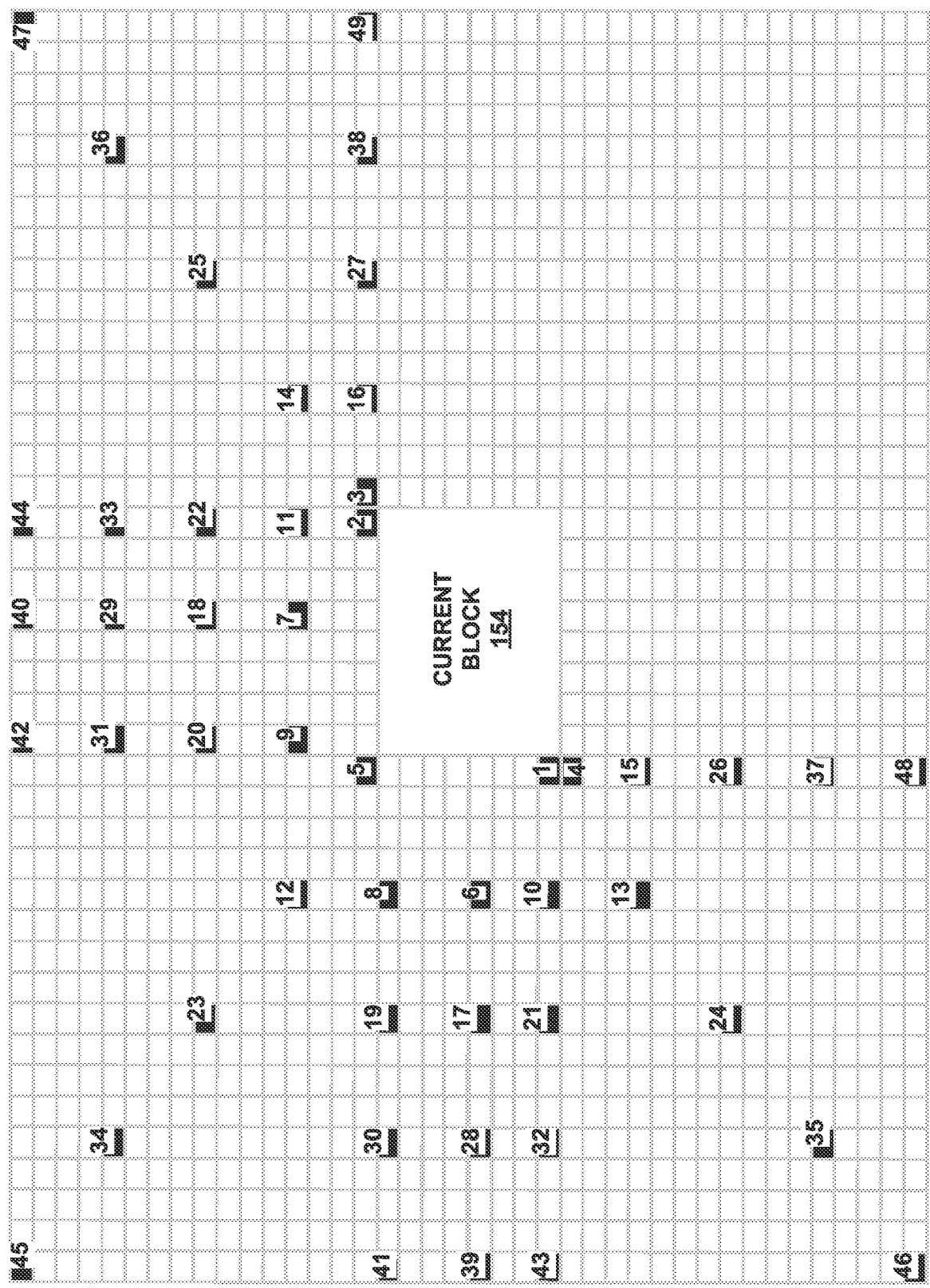
FIG. 9 is a conceptual diagram illustrating spatial neighbor blocks that may be used to derive spatial merge candidates.

FIG. 9 is a conceptual diagram illustrating non-adjacent spatial neighbor blocks that may be used to derive spatial merge candidates. Non-adjacent spatial merge candidates to current block 154 may be used as described in Han et al., "CE4.4.6: Improvement on Merge/Skip mode," JVET WG 05 MPEG Joint Video Coding Team(s) with ITU-T SG 16, document no. JVET-L0399, Oct. 1, 2018 (hereinafter, "JVET-L0399"). These candidates may be inserted after the TMVP in the regular merge candidate list. The pattern of spatial merge candidates is shown in FIG. 9. The distances between non-adjacent spatial candidates and current block 154 are based on the width and height of current block 154. The line buffer restriction is not applied.

Figure 10:
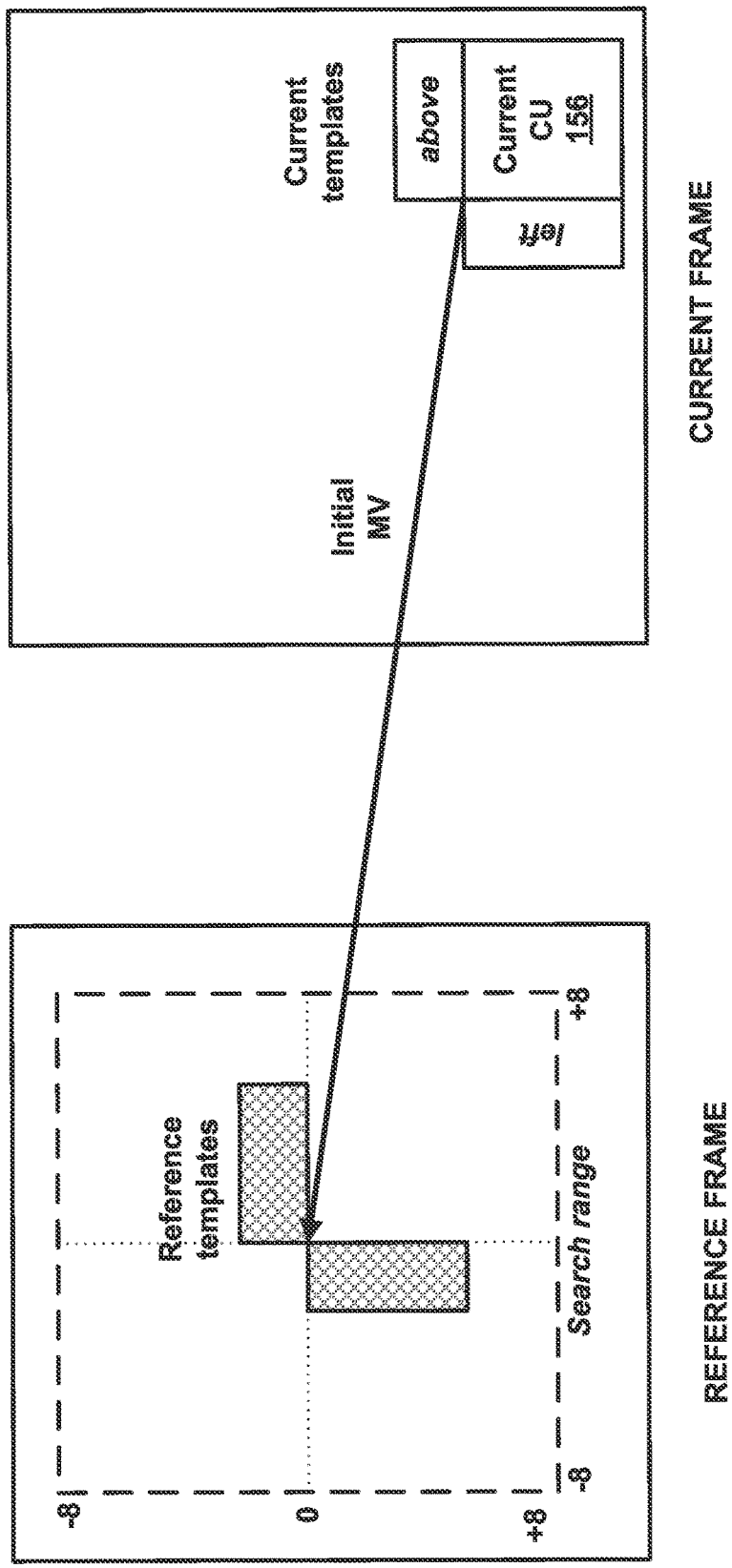
FIG. 10 is a conceptual diagram illustrating an example of template matching performed on a search area around an initial area identified by a motion vector (MV).

FIG. 10 is a conceptual diagram illustrating an example of template matching performed on a search area around an initial area identified by a motion vector (MV). Template matching (TM) is a decoder-side MV derivation method to refine the motion information of current CU 156 by finding the closest match between a template (i.e., top and/or left neighboring blocks of current CU 156) in the current picture and a block (i.e., same size to the template) in a reference picture. As illustrated in FIG. 10, a better MV is searched around the initial motion of current CU 156 within a [−8, +8]-pel search range. The template matching techniques in Chen et al., "Description of SDR, HDR and 3600 video coding technology proposal by Qualcomm and Technicolor—low and high complexity versions," JVET WG 05 MPEG Joint Video Coding Team(s) with ITU-T SG 16, document no. JVET-J0021, Apr. 14, 2018 (hereinafter, "JVET-J0021"), may be used with the following modifications: search step size is determined based on AMVR mode and TM can be cascaded with bilateral matching process in merge modes.

In AMVP mode, an MVP candidate is determined based on template matching error to select the one which reaches the minimum difference between the current block template and the reference block template, and then TM is performed only for this particular MVP candidate for MV refinement. TM refines this MVP candidate, starting from full-pel MVD precision (or 4-pel for 4-pel AMVR mode) within a [−8, +8]-pel search range by using iterative diamond search. The AMVP candidate may be further refined by using cross search with full-pel MVD precision (or 4-pel for 4-pel AMVR mode), followed sequentially by half-pel and quarter-pel ones depending on AMVR mode as specified in Table 1. This search process ensures that the MVP candidate still keeps the same MV precision as indicated by the AMVR mode after TM process. In the search process, if the difference between the previous minimum cost and the current minimum cost in the iteration is less than a threshold that is equal to the area of the block, the search process terminates.

TABLE 1

| Search pattern | AMVR mode | | | | Merge mode | |
|---|---|---|---|---|---|---|
| | 4-pel | Full-pel | Half-pel | Quarter-pel | AltIF = 0 | AltIF = 1 |
| 4-pel diamond | v | | | | | |
| 4-pel cross | v | | | | | |
| Full-pel diamond | | v | v | v | v | v |
| Full-pel cross | | v | v | v | v | v |
| Half-pel cross | | | v | v | v | v |
| Quarter-pel cross | | | | v | v | |
| ⅛-pel cross | | | | | v | |

In merge mode, a similar search technique may be applied to the merge candidate indicated by the merge index. As Table 1 shows, TM may perform all the way down to ⅛-pel MVD precision or skipping those beyond half-pel MVD precision, depending on whether the alternative interpolation filter (that is used when AMVR is of half-pel mode) is used according to merged motion information. Besides, when TM mode is enabled, template matching may work as an independent process or an extra MV refinement process between block-based and subblock-based bilateral matching (BM) methods, depending on whether BM can be enabled or not according to its enabling condition check.

Figure 11:
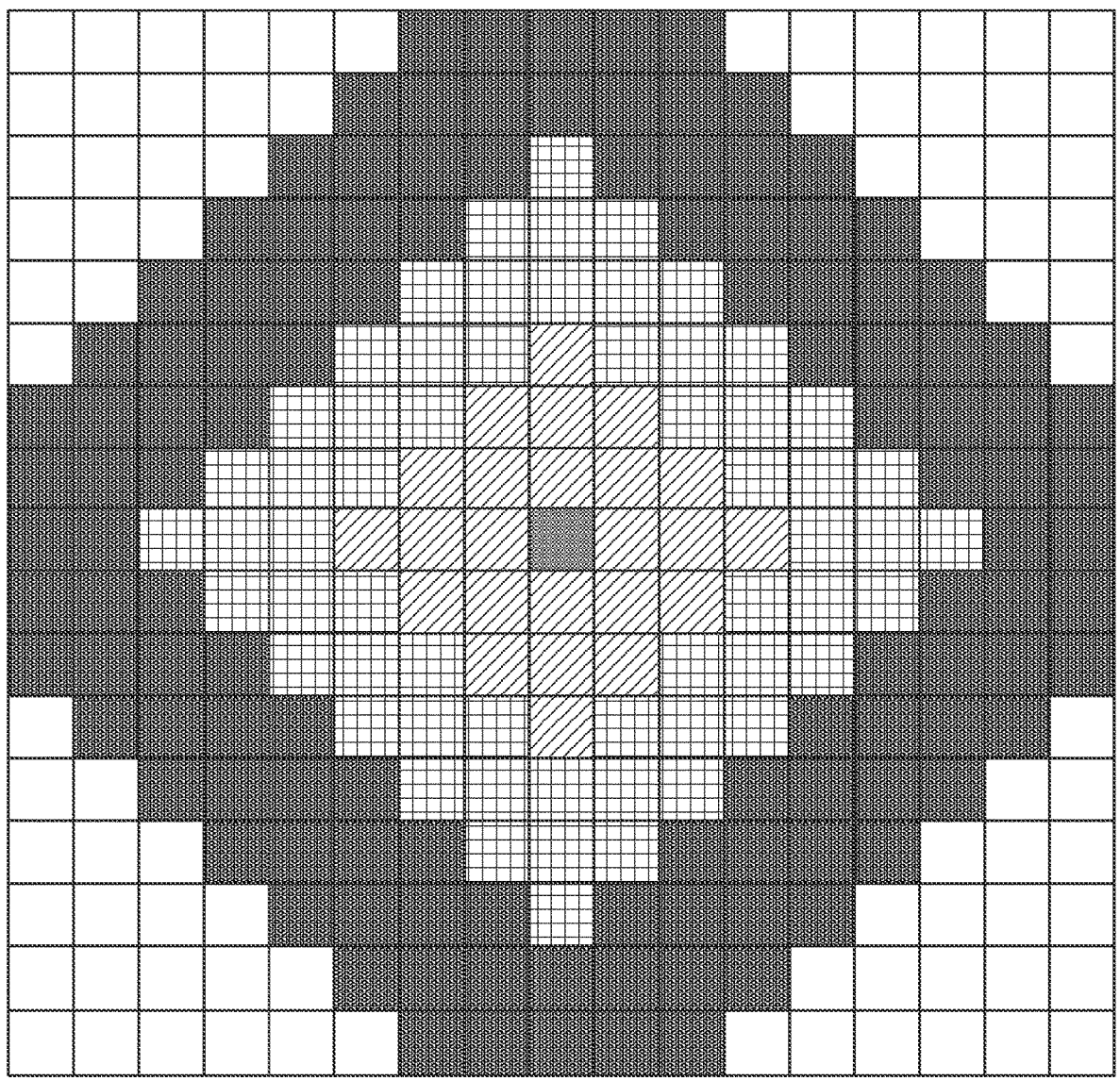
FIG. 11 is a conceptual diagram illustrating an example set of diamond regions in a search area.

FIG. 11 is a conceptual diagram illustrating an example set of diamond regions 158 in a search area. A multi-pass decoder-side motion vector refinement is applied in ECM. In the first pass, bilateral matching (BM) is applied to the coding block. In the second pass, BM is applied to each 16×16 subblock within the coding block. In the third pass, MV in each 8×8 subblock is refined by applying bi-directional optical flow (BDOF). The refined MVs are stored for both spatial and temporal motion vector prediction.

In the first pass, a refined MV is derived by applying BM to a coding block. Similar to decoder-side motion vector refinement (DMVR), in bi-prediction operation, a refined MV is searched around the two initial MVs (MV0 and MV1) in the reference picture lists L0 and L1. The refined MVs (MV0_pass1 and MV1_pass1) are derived around the initiate MVs based on the minimum bilateral matching cost between the two reference blocks in L0 and L1.

BM performs local search to derive integer sample precision intDeltaMV. The local search applies a 3×3 square search pattern to loop through the search range [−sHor, sHor] in horizontal direction and [−sVer, sVer] in vertical direction, wherein, the values of sHor and sVer are determined by the block dimension, and the maximum value of sHor and sVer is 8.

The bilateral matching cost is calculated as: bilCost=mvDistanceCost+sadCost. When the block size cbW*cbH is greater than 64, MRSAD cost function is applied to remove the DC effect of distortion between reference blocks. When the bilCost at the center point of the 3×3 search pattern has the minimum cost, the intDeltaMV local search is terminated. Otherwise, the current minimum cost search point becomes the new center point of the 3×3 search pattern and continue to search for the minimum cost, until it reaches the end of the search range.

The existing fractional sample refinement is further applied to derive the final deltaMV. The refined MVs after the first pass is then derived as:

$$MV0\_pass1 = MV0 + deltaMV$$

$$MV1\_pass1 = MV1 - deltaMV$$

In the second pass, a refined MV is derived by applying BM to a 16×16 grid subblock. For each subblock, a refined MV is searched around the two MVs (MV0_pass1 and MV1_pass1), obtained on the first pass, in the reference picture list L0 and L1. The refined MVs (MV0_pass2 (sbIdx2) and MV1_pass2(sbIdx2)) are derived based on the minimum bilateral matching cost between the two reference subblocks in L0 and L1.

For each subblock, BM performs full search to derive integer sample precision intDeltaMV. The full search has a search range [−sHor, sHor] in horizontal direction and [−sVer, sVer] in vertical direction, wherein, the values of sHor and sVer are determined by the block dimension, and the maximum value of sHor and sVer is 8.

The bilateral matching cost is calculated by applying a cost factor to the SATD cost between two reference subblocks, as: bilCost=satdCost*costFactor. The search area (2*sHor+1)*(2*sVer+1) is divided up to 5 diamond shape search regions shown in FIG. 11. Each search region is assigned a costFactor, which is determined by the distance (intDeltaMV) between each search point and the starting MV, and each diamond region is processed in the order starting from the center of the search area. In each region, the search points are processed in the raster scan order starting from the top left going to the bottom right corner of the region. When the minimum bilCost within the current search region is less than a threshold equal to sbW*sbH, the int-pel full search is terminated, otherwise, the int-pel full search continues to the next search region until all search points are examined. Additionally, if the difference between the previous minimum cost and the current minimum cost in the iteration is less than a threshold that is equal to the area of the block, the search process terminates.

The existing VVC DMVR fractional sample refinement is further applied to derive the final deltaMV(sbIdx2). The refined MVs at second pass is then derived as:

$$MV0\_pass2(sbIdx2) = MV0\_pass1 + deltaMV(sbIdx2)$$

$$MV1\_pass2(sbIdx2) = MV1\_pass1 - deltaMV(sbIdx2)$$

In the third pass, a refined MV is derived by applying BDOF to an 8×8 grid subblock. For each 8×8 subblock, BDOF refinement is applied to derive scaled Vx and Vy without clipping starting from the refined MV of the parent subblock of the second pass. The derived bioMv(Vx, Vy) is rounded to 1/16 sample precision and clipped between −32 and 32.

The refined MVs (MV0_pass3(sbIdx3) and MV1_pass3 (sbIdx3)) at third pass are derived as:

$$MV0\_pass3(sbIdx3) = MV0\_pass2(sbIdx2) + bioMv$$

$$MV1\_pass3(sbIdx3) = MV0\_pass2(sbIdx2) - bioMv$$

Adaptive decoder side motion vector refinement method is an extension of multi-pass DMVR which includes the two new merge modes to refine a MV only in one direction, either L0 or L1, of the bi prediction for the merge candidates that meet the DMVR conditions. The multi-pass DMVR process is applied for the selected merge candidate to refine the motion vectors. However, either MVD0 or MVD1 is set to zero in the 1st pass (i.e., PU level) DMVR.

The merge candidates for the new merge mode are derived from spatial neighboring coded blocks, TMVPs, non-adjacent blocks, HMVPs, pair-wise candidate, similar as in the regular merge mode. The difference is that only those meet DMVR conditions are added into the candidate list. The same merge candidate list is used by the two new merge modes. Merge index is coded as in regular merge mode.

When overlapped block motion compensation (OBMC) is applied, top and left boundary pixels of a CU are refined using neighboring block's motion information with a weighted prediction as described in Lin et al., "CE10.2.1: OBMC," JVET WG 05 MPEG Joint Video Coding Team(s) with ITU-T SG 16, document no. JVET-L0101, Oct. 1, 2018 (hereinafter, "JVET-L0101"). Conditions of not applying OBMC may include the following:

When OBMC is disabled at SPS level
When current block has intra mode or IBC mode
When current block applies LIC
When current luma block area is smaller than or equal to 32

A subblock-boundary OBMC may be performed using the same blending to the top, left, bottom, and right subblock boundary pixels using neighboring subblocks' motion information. It may be enabled for the subblock based coding tools:

Affine AMVP modes;
Affine merge modes and subblock-based temporal motion vector prediction (SbTMVP);
Subblock-based bilateral matching.

When OBMC mode is used in CIIP mode with LMCS, inter blending is performed prior to LMCS mapping of inter samples. LMCS is applied to blended inter samples which are combined with LMCS applied intra samples in CIIP mode, $$Inter'_{predY} = \frac{(128 - w_1) \times Inter_{predY} + w_1 \times OBMC_{predY}}{128}$$

$$PredY = \frac{(4 - w_0) \times FwdMap(Inter'_{predY}) + w_0 \times Intra_{predY}}{4}$$

where $Inter_{predY}$ represents the samples predicted by the motion of current block in the original domain, $Intra_{predY}$ represents the samples predicted in the mapped domain, $OBMC_{predY}$ represents the samples predicted by the motion of neighboring blocks in the original domain, and $w_0$ and $w_1$ are the weights.

In sample-based BDOF, instead of deriving motion refinement (Vx, Vy) on a block basis, it is performed per sample. The coding block is divided into 8×8 subblocks. For each subblock, whether to apply BDOF or not is determined by checking the SAD between the two reference subblocks against a threshold. If decided to apply BDOF to a subblock, for every sample in the subblock, a sliding 5×5 window is used and the existing BDOF process is applied for every sliding window to derive Vx and Vy. The derived motion refinement (Vx, Vy) is applied to adjust the bi-predicted sample value for the center sample of the window.

Figure 12:
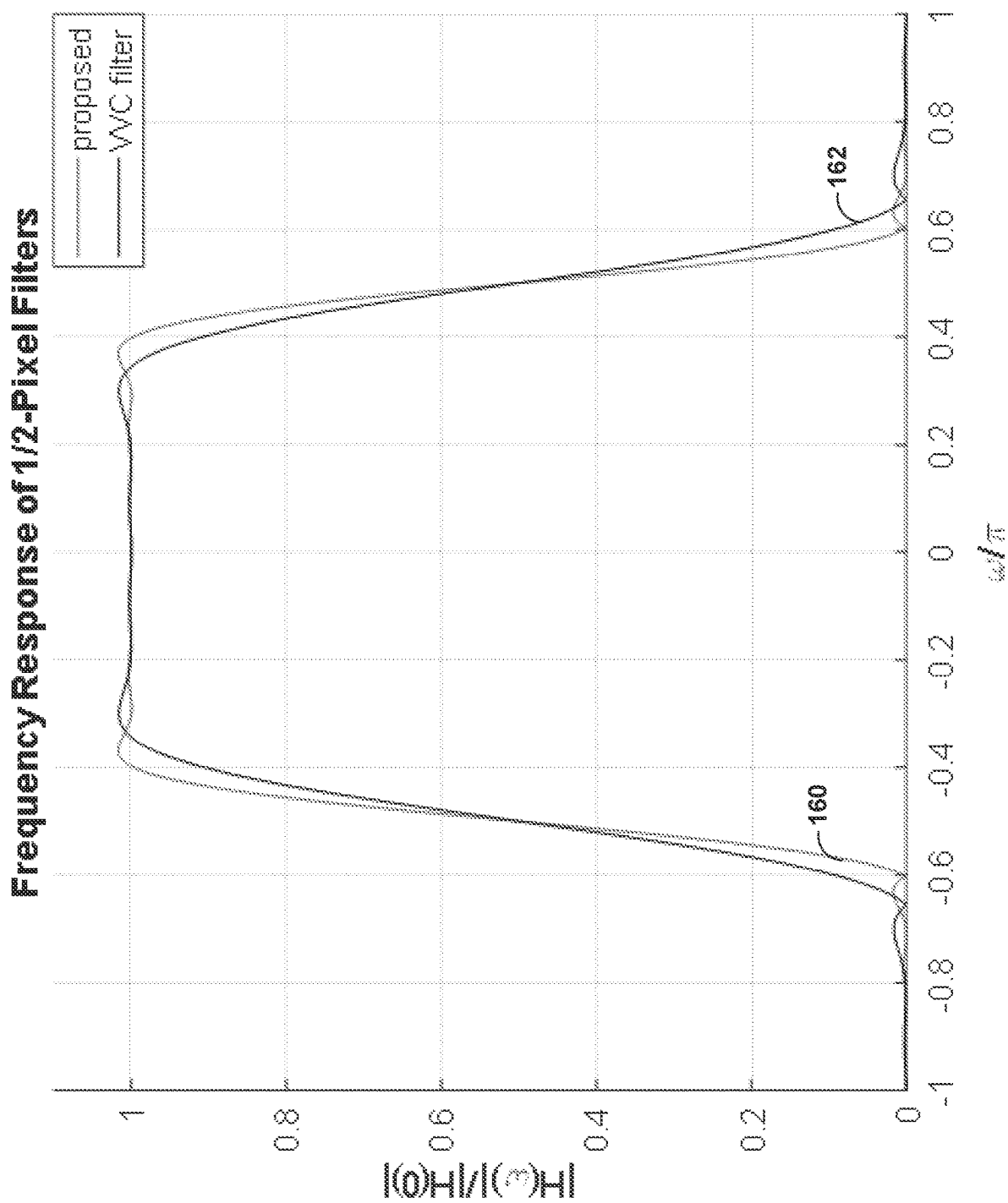
FIG. 12 is a graph illustrating frequency responses of interpolation filters at half-pixel phase.

FIG. 12 is a graph illustrating frequency responses of interpolation filters at half-pixel phase. VVC includes an 8-tap interpolation filter. This interpolation filter may be replaced with a 12-tap filter. The interpolation filter is derived from the sinc function of which the frequency response is cut off at Nyquist frequency, and cropped by a cosine window function. Table 2 gives the filter coefficients of all 16 phases. FIG. 12 depicts a graph that compares the frequency responses of the interpolation filters 160 with the VVC interpolation filter 162, all at half-pel phase.

TABLE 2

| 1/16 | −1 | 2 | −3 | 6 | −14 | 254 | 16 | −7 | 4 | −2 | 1 | 0 |
|---|---|---|---|---|---|---|---|---|---|---|---|---|
| 2/16 | −1 | 3 | −7 | 12 | −26 | 249 | 35 | −15 | 8 | −4 | 2 | 0 |
| 3/16 | −2 | 5 | −9 | 17 | −36 | 241 | 54 | −22 | 12 | −6 | 3 | −1 |
| 4/16 | −2 | 5 | −11 | 21 | −43 | 230 | 75 | −29 | 15 | −8 | 4 | −1 |
| 5/16 | −2 | 6 | −13 | 24 | −48 | 216 | 97 | −36 | 19 | −10 | 4 | −1 |
| 6/16 | −2 | 7 | −14 | 25 | −51 | 200 | 119 | −42 | 22 | −12 | 5 | −1 |
| 7/16 | −2 | 7 | −14 | 26 | −51 | 181 | 140 | −46 | 24 | −13 | 6 | −2 |
| 8/16 | −2 | 6 | −13 | 25 | −50 | 162 | 162 | −50 | 25 | −13 | 6 | −2 |
| 9/16 | −2 | 6 | −13 | 24 | −46 | 140 | 181 | −51 | 26 | −14 | 7 | −2 |
| 10/16 | −1 | 5 | −12 | 22 | −42 | 119 | 200 | −51 | 25 | −14 | 7 | −2 |
| 11/16 | −1 | 4 | −10 | 19 | −36 | 97 | 216 | −48 | 24 | −13 | 6 | −2 |
| 12/16 | −1 | 4 | −8 | 15 | −29 | 75 | 230 | −43 | 21 | −11 | 5 | −2 |
| 13/16 | −1 | 3 | −6 | 12 | −22 | 54 | 241 | −36 | 17 | −9 | 5 | −2 |
| 14/16 | 0 | 2 | −4 | 8 | −15 | 35 | 249 | −26 | 12 | −7 | 3 | −1 |
| 15/16 | 0 | 1 | −2 | 4 | −7 | 16 | 254 | −14 | 6 | −3 | 2 | −1 |

Winken et al., "CE10: Multi-hypothesis inter prediction (Test 10.1.2)," JVET WG 05 MPEG Joint Video Coding Team(s) with ITU-T SG 16, document no. JVET-M0425, Jan. 7, 2019 (hereinafter, "JVET-M0425") describes multi-hypothesis inter-prediction mode (MHP). In MHP, one or more additional motion-compensated prediction signals are signaled, in addition to the conventional bi prediction signal. The resulting overall prediction signal is obtained by sample-wise weighted superposition. With the bi prediction signal $P_{bi}$ and the first additional inter prediction signal/hypothesis $h_3$, the resulting prediction signal $P_3$ is obtained as follows:

$$p_3 = (1-\alpha)p_{bi} + \alpha h_3$$

The weighting factor α is specified by the new syntax element add_hyp_weight_idx, according to the following mapping:

| add_hyp_weight_idx | α |
|---|---|
| 0 | 1/4 |
| 1 | −1/8 |

Analogously to above, more than one additional prediction signal can be used. The resulting overall prediction signal is accumulated iteratively with each additional prediction signal.

$$p_{n+1} = (1-\alpha_{n+1})p_n + \alpha_{n+1}h_{n+1}$$

The resulting overall prediction signal is obtained as the last $p_n$ (i.e., the $p_n$ having the largest index n). Within this EE, up to two additional prediction signals can be used (i.e., n is limited to 2).

The motion parameters of each additional prediction hypothesis can be signaled either explicitly by specifying the reference index, the motion vector predictor index, and the motion vector difference, or implicitly by specifying a merge index. A separate multi-hypothesis merge flag distinguishes between these two signalling modes.

For inter AMVP mode, MHP is only applied if non-equal weight in BCW is selected in bi-prediction mode.

Combination of MHP and BDOF is possible, however the BDOF is only applied to the bi-prediction signal part of the prediction signal (i.e., the ordinary first two hypotheses).

Figure 13:
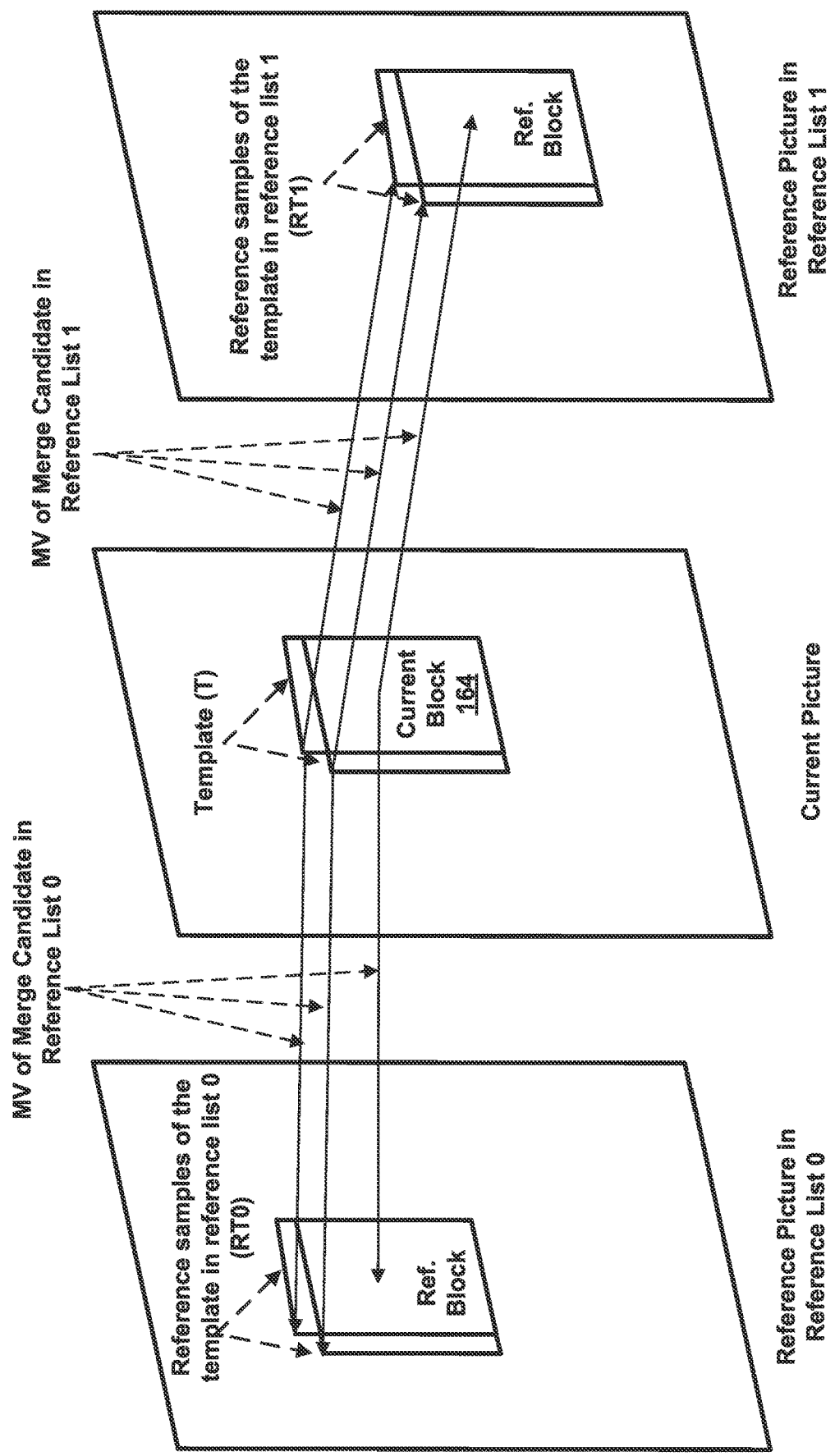
FIG. 13 is a conceptual diagram illustrating an example of a template and reference samples of the template in reference pictures.

FIG. 13 is a conceptual diagram illustrating an example of a template and reference samples of the template in reference pictures for current block 164. Merge candidates may be adaptively reordered with template matching according to adaptive reordering of merge candidates with template matching (ARMC-TM). The reordering method is applied to regular merge mode, template matching TM merge mode, and affine merge mode (excluding the SbTMVP candidate). For the TM merge mode, merge candidates are reordered before the refinement process.

After a merge candidate list is constructed, merge candidates are divided into several subgroups. The subgroup size is set to 5 for regular merge mode and TM merge mode. The subgroup size is set to 3 for affine merge mode. Merge candidates in each subgroup are reordered ascendingly according to cost values based on template matching. For simplification, merge candidates in the last but not the first subgroup are not reordered.

The template matching cost of a merge candidate is measured by the sum of absolute differences (SAD) between samples of a template of current block 164 and their corresponding reference samples. The template comprises a set of reconstructed samples neighboring to current block 164. Reference samples of the template are located by the motion information of the merge candidate.

When a merge candidate utilizes bi-directional prediction, the reference samples of the template of the merge candidate are also generated by bi-prediction as shown in FIG. 13.

Figure 14:
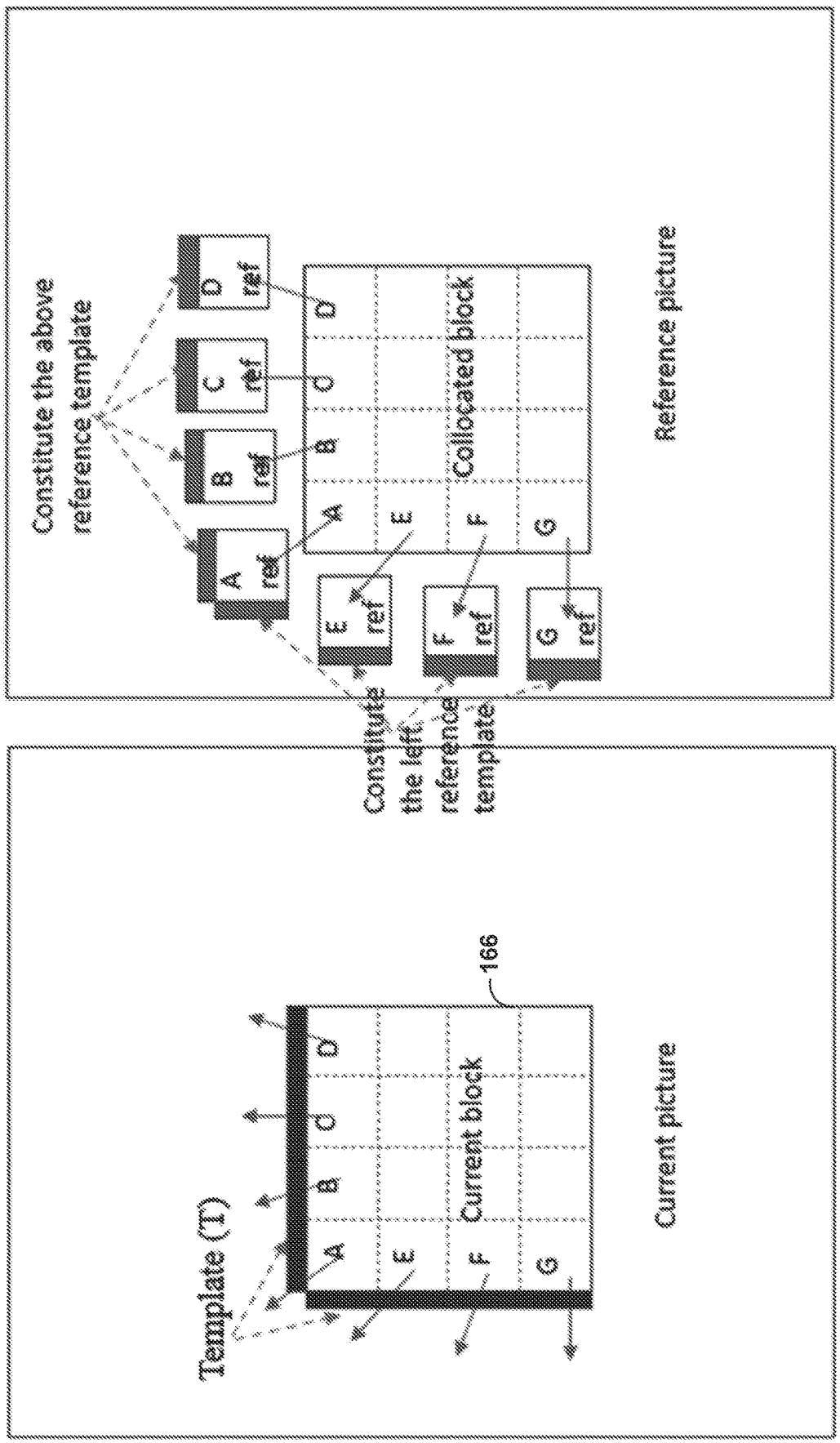
FIG. 14 is a conceptual diagram illustrating a template and reference samples of the template for a current block with sub-block motion using motion information of sub-blocks of the current block.

FIG. 14 is a conceptual diagram illustrating a template and reference samples of the template for current block 166 with sub-block motion using motion information of sub-blocks of current block 166. For subblock-based merge candidates with subblock size equal to Wsub×Hsub, the above template comprises several sub-templates with the size of Wsub×1, and the left template comprises several sub-templates with the size of 1×Hsub. As shown in FIG. 14, the motion information of the subblocks in the first row and the first column of current block 166 is used to derive the reference samples of each sub-template.

Geometric partitioning mode (GPM) with merge motion vector differences (MMVD) in VVC may be extended by applying motion vector refinement on top of the existing GPM uni-directional MVs. A flag is first signalled for a GPM CU, to specify whether this mode is used. If the mode is used, each geometric partition of a GPM CU can further decide whether to signal MVD or not. If MVD is signalled for a geometric partition, after a GPM merge candidate is selected, the motion of the partition is further refined by the signalled MVDs information. All other procedures are kept the same as in GPM.

The MVD is signaled as a pair of distance and direction, similar as in MMVD. There are nine candidate distances (¼-pel, ½-pel, 1-pel, 2-pel, 3-pel, 4-pel, 6-pel, 8-pel, 16-pel), and eight candidate directions (four horizontal/vertical directions and four diagonal directions) involved in GPM with MMVD (GPM-MMVD). In addition, when pic_fpel_mmvd_enabled_flag is equal to 1, the MVD is left shifted by 2 as in MMVD.

Template matching may be applied to GPM. When GPM mode is enabled for a CU, a CU-level flag is signaled to indicate whether TM is applied to both geometric partitions. Motion information for each geometric partition is refined using TM. When TM is chosen, a template is constructed using left, above or left and above neighboring samples according to partition angle, as shown in Table 3. The motion is then refined by minimizing the difference between the current template and the template in the reference picture using the same search pattern of merge mode with half-pel interpolation filter disabled.

In bilateral matching AMVP merge mode, a bi-directional predictor includes an AMVP predictor in one direction and a merge predictor in the other direction. The mode can be enabled for a coding block when the selected merge predictor and the AMVP predictor satisfy a DMVR condition, where there is at least one reference picture from the past and one reference picture from the future relatively to the current picture and the distances from two reference pictures to the current picture are the same, the bilateral matching MV refinement is applied for the merge MV candidate and AMVP MVP as a starting point. Otherwise, if template matching functionality is enabled, template matching MV refinement is applied to the merge predictor or the AMVP predictor which has a higher template matching cost.

The AMVP part of the mode is signaled as a regular uni-directional AMVP, i.e., reference index and MVD are signaled, and it has a derived MVP index if template matching is used or MVP index is signaled when template matching is disabled.

For AMVP direction LX, X can be 0 or 1, the merge part in the other direction (1−LX) is implicitly derived by minimizing the bilateral matching cost between the AMVP predictor and a merge predictor, i.e., for a pair of the AMVP and a merge motion vectors. For every merge candidate in the merge candidate list which has that other direction (1−LX) motion vector, the bilateral matching cost is calculated using the merge candidate MV and the AMVP MV. The merge candidate with the smallest cost is selected. The bilateral matching refinement is applied to the coding block with the selected merge candidate MV and the AMVP MV as a starting point.

TABLE 3

| Partition angle | 0 | 2 | 3 | 4 | 5 | 8 | 11 | 12 | 13 | 14 |
|---|---|---|---|---|---|---|---|---|---|---|
| 1st partition | A | A | A | A | L + A | L + A | L + A | L + A | A | A |
| 2nd partition | L + A | L + A | L + A | L | L | L | L | L + A | L + A | L + A |
| Partition angle | 16 | 18 | 19 | 20 | 21 | 24 | 27 | 28 | 29 | 30 |
| 1st partition | A | A | A | A | L + A | L + A | L + A | L + A | A | A |
| 2nd partition | L + A | L + A | L + A | L | L | L | L | L + A | L + A | L + A |

A GPM candidate list may be constructed as follows:
1. Interleaved List-0 MV candidates and List-1 MV candidates are derived directly from the regular merge candidate list, where List-0 MV candidates are higher priority than List-1 MV candidates. A pruning method with an adaptive threshold based on the current CU size is applied to remove redundant MV candidates.
2. Interleaved List-1 MV candidates and List-0 MV candidates are further derived directly from the regular merge candidate list, where List-1 MV candidates are higher priority than List-0 MV candidates. The same pruning method with the adaptive threshold is also applied to remove redundant MV candidates.
3. Zero MV candidates are padded until the GPM candidate list is full.

The GPM-MMVD and GPM-TM are exclusively enabled to one GPM CU. This is done by firstly signaling the GPM-MMVD syntax. When both two GPM-MMVD control flags are equal to false (i.e., the GPM-MMVD are disabled for two GPM partitions), the GPM-TM flag is signaled to indicate whether the template matching is applied to the two GPM partitions. Otherwise (at least one GPM-MMVD flag is equal to true), the value of the GPM-TM flag is inferred to be false.

The third pass of multi pass DMVR which is 8×8 sub-PU BDOF refinement of the multi-pass DMVR is enabled to AMVP-merge mode coded block.

The mode is indicated by a flag, if the mode is enabled AMVP direction LX is further indicated by a flag.

Figure 15:
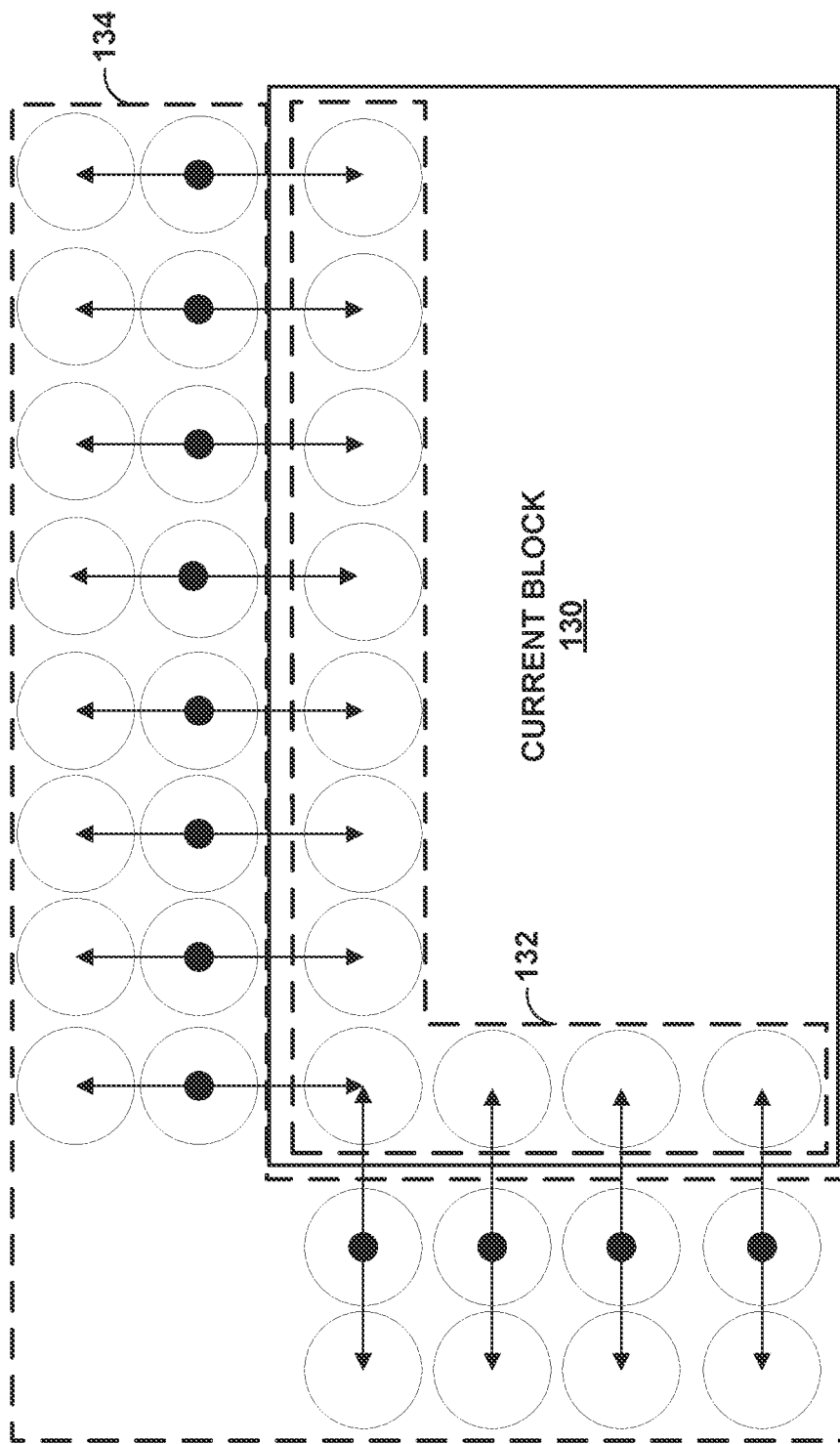
FIG. 15 is conceptual diagram illustrating an example discontinuity measure.

FIG. 15 is conceptual diagram illustrating an example discontinuity measure for sign prediction. The basic idea of the coefficient sign prediction method (Henry et al., "Residual Coefficient Sign Prediction," JVET WG 05 MPEG Joint Video Coding Team(s) with ITU-T SG 16, document no. JVET-D0031, Oct. 20, 2016, (hereinafter, "JVET-D0031") and JVET-J0021) is to calculate reconstructed residual for both negative and positive sign combinations for applicable transform coefficients and select the hypothesis that minimizes a cost function.

To derive the best sign, the cost function is defined as discontinuity measure across block boundary, e.g., as shown in FIG. 15. FIG. 15 depicts current block 130 including reconstructed sign candidates 132. Neighboring blocks to current block 130 include reconstructed neighbors 134. The cost function may be measured for all hypotheses, and the video coder may select the hypothesis resulting in the smallest cost as a predictor for coefficient signs.

The cost function is defined as a sum of absolute second derivatives in the residual domain for the above row and left column as follows:

$$\text{cost} = \sum_{x=0}^{w} |(-R_{x,-1}+2R_{x,0}-P_{x,1})-r_{x,1}| + \sum_{y=0}^{h} |(-R_{-1,y}+2R_{0,y}-P_{1,y})-r_{1,y}|,$$

where R is reconstructed neighbors 134, P is prediction of current block 130, and r is the residual hypothesis. The term $(-R_{-1}+2R_0-P_1)$ can be calculated once per block and only residual hypothesis is subtracted.

This disclosure describes various techniques, which may be applied alone or in any combination by video encoder 200 and/or video decoder 300, to address the various issues discussed above. In VVC, ECM, or other state-of-the art video codecs, motion information of a coded block is stored for the use of motion prediction for the following blocks. Per the techniques of this disclosure, if a MV of current coded block points out of the picture boundary, its motion information may be modified before being stored in the motion buffer for motion prediction.

In one example, for bi-predicted block, if one of the MV points to the position that is OOB and one of the MV does not, then the video coder may change the motion information to uni-prediction, which only keeps the MV that does not point to the position that is OOB.

In another example, if MVs are stored per N×N block, whether to change the motion information from bi-prediction to uni-prediction depends on the number of reference pixels for that block that are out of picture boundary. A threshold may be set, for example, the threshold is set equal to the half of the area of the block, i.e., N*N/2. If the number of reference pixels for that block that are out of picture boundary is larger than the threshold in one direction, then change the motion information from bi-prediction to uni-prediction for the block.

In ECM, subblock based OBMC is applied after motion information is spanned, i.e., set for each subblock of current block. Also, the residual signal is reconstructed after motion information is spanned, as the sign prediction in residual signal reconstruction would require access to the motion information for generating the predictors.

In some examples, the conversion of bi-prediction to uni-prediction is applied before OBMC, i.e., OBMC uses the motion information after conversion (if activated). In another example, the conversion is applied after OBMC, i.e., OBMC uses the motion information before conversion.

In some examples, the conversion of bi-prediction to uni-prediction is applied before residual reconstruction, i.e., sign prediction uses the motion information after conversion. In another example, the conversion is applied after residual reconstruction, i.e., sign prediction uses the motion information before conversion.

Additionally or alternatively, video encoder 200 and video decoder 300 may be configured to apply certain modifications to the decoder-side motion refinement techniques discussed above. In an example, when at least one of the initial MVs of a block points to a position that is OOB, the respective refinement processes of decoder-side motion refinement methods are bypassed. Thus, none of the initial MVs of a block is refined. If not otherwise stated, the aforementioned block in this section could be a coding unit, a prediction unit, or a subblock inside a coding unit or prediction unit, and the initial MVs are the input to a decoder-side motion refinement process.

In another example, the OOB condition check occurs during the search process instead. In the other words, except for the initial MVs of a block, all other positions pointed to by respective MV candidates that a decoder-side motion refinement method can visit need to be checked by using OOB condition check. Matching cost is computed only when both MVs of a MV candidate do not point positions that are GOB. A MV candidate inside the search range of a decoder-side motion refinement method is marked as unavailable if either one of its MV points to a position that is GOB.

In another example, the OOB condition check occurs during the search process to determine whether the matching cost of a MV candidate inside the search range needs to be scaled. When either one of the MVs of a MV candidate points to a position that is GOB, the matching cost corresponding to this MV candidate is scaled up by a function:

$$F(\text{cost}, s_0, s_1, s_2, \ldots) = \text{cost} + \sum_{i \in \{0,1,2,\ldots\}} (s_i * (\text{cost} >> i)),$$

where $s_i$'s are non-negative integers. These $s_i$'s are set equal to zero in the case when OOB does not occur for a MV candidate. When OOB occurs for a MV candidate, at least one of $s_i$'s is non-zero.

Additionally or alternatively, video encoder 200 and video decoder 300 may be configured to apply a modified version of bi-directional optical flow (BDOF) as discussed below. In one example, when a first predictor for a pixel location is OOB, and a second predictor is not, then value of the first predictor for the pixel location is set equal to the value of the second predictor before the BDOF process is applied. Therefore, BDOF process for deriving the delta motion vector (v_x, v_y) uses the modified predictors as input. The BDOF process itself does not change.

In another example, when a first predictor for a pixel location is GOB, and a second predictor is not, then value of the first predictor for the pixel location is set equal to the value of the second predictor before the BDOF process is applied. Therefore, BDOF process for deriving the gradients and delta motion vector (v_x, v_y) uses the modified predictors as input. After the gradients (v_x, v_y) are derived, the offset is not applied to the pixel position that has an OOB predictor and a non-GOB predictor. Instead, the value of the final predictor for such pixel position is set to the value of the non-GOB predictor.

In another example, when a subset of the surround area to derive the gradients (v_x, v_y) has a pixel location is OOB the gradients (v_x, v_y) values are set to zero. Wherein, when BDOF is processed in M×M subblock, the surround area is a N×N window around the subblock, e.g., M is equal to 4, N is equal to 6. Wherein, when BDOF is processed per sample, the surround area is a N×N window around the sample, e.g., N is equal to 5.

In one example, when a subset of the surround area of a first predictor has a pixel location is OOB or a subset of the surround area of a second predictor has a pixel location is OOB, the gradients (v_x, v_y) values are set to zero.

In one example, when a subset of the surround area of a first predictor has a pixel location is OOB and the surround area of a second predictor does not have a pixel location is OOB, the gradients (v_x, v_y) values are set to zero.

In one example, when the surround area of a first predictor does not have a pixel location is OOB and a subset of the surround area of a second predictor has a pixel location is OOB, the gradients (v_x, v_y) values are set to zero.

In one example, the subset of the surround area (N×N widow) is a K×K window, wherein, K is equal or less than N. In one example, the subset of the surround area has same number of samples as the number of samples that is processed by BDOF.

In one example, a subblock is determined to skip BDOF process by checking the following conditions:
1. the SAD between the two reference subblocks against a threshold
2. a first predictor has a pixel location is OOB
3. all pixel locations of a first predictor are non-GOB
4. a second predictor has a pixel location is OOB
5. all pixel locations of a second predictor are non-GOB When a subset of the conditions is satisfied, a subblock is determined to skip BDOF process.

In one example, a subblock is determined to skip BDOF process when condition 1), 3), 5) are satisfied.

In one example, a subblock is determined to skip BDOF process when condition 1), 2), 4) are satisfied.

In one example, when the condition 1) is satisfied, but the BDOF process is determined to be applied to the pixels within the current subblock, the subblock BDOF my refinement delta MV (bioMv as discussed above) is set to zero.

Additionally or alternatively, video encoder 200 and video decoder 300 may be configured to perform a modified version of prediction refinement with optical flow (PROF) for affine mode. In one example, when calculating the gradients (horizontal and vertical) for PROF, if the motion vector of that pixel points to the position that is out of picture boundary, its corresponding gradient value is set to zero.

Additionally or alternatively, video encoder 200 and video decoder 300 may be configured to perform a modified version of overlapped block motion compensation (OBMC). In one example, the video coder may use motion information of a neighboring block to generate additional predictor and blend with the current predictor. Note that the additional predictor itself may be generated by bi-prediction, which may has one OOB predictor and one non-GOB predictor. In this case the additional predictor is set to the value of non-GOB predictor as proposed in JVET-Y0125. However, JVET-Y0125 does not modify the process if both predictors are OOB. In this invention, it's proposed to discard the additional predictor if it's bi-prediction and both predictors are OOB.

Additionally or alternatively, video encoder 200 and video decoder 300 may be configured to perform a modified combined intra-inter prediction (CIIP) technique. In one example, the OOB inter-predictor in CIIP is kept, i.e., not discarded even when it is derived from across an out of picture boundary. In another example, the OOB inter-predictor in CIIP is kept, but the weight parameter is adjusted such that it is less than or equal to the weight when it is not OOB.

Additionally or alternatively, video encoder 200 and video decoder 300 may be configured to perform a modified merge list construction process. For example, when checking a merge candidate, the candidate is not added into the merge list if one of the following conditions is met:
  If the candidate is an uni-prediction candidate, and the whole reference block of this uni-prediction candidate is located OOB.
  If the candidate is an uni-prediction candidate, and n1% reference block of this uni-prediction candidate is located OOB, where n1 is a positive value between 0 to 100, and is calculated by the number of OOB samples over the number of samples of the reference block. In one example, n1 is subject to block sizes or the number of pixels.
  If the candidate is a bi-prediction candidate, and the whole reference blocks of List 0 and List 1 of this bi-prediction candidate are located OOB.
  If the candidate is a bi-prediction candidate, n2% reference block of List 0 of this bi-prediction candidate is located OOB, n3% reference block of List 1 of this bi-prediction candidate is located OOB, where n1 and n2 are positive values between 0 to 100, and are calculated by the number of OOB samples over the number of samples of the reference block. In one example, n2 and n3 are subject to block sizes or the number of pixels. In another one example, n2 is equal to n3. In another one example, n1 is equal to n2 and n3.

The video coder may, according to these techniques, apply only one or at least two of the above conditions to decide whether to add a merge candidate into the merge list. The method may be applied when adding a candidate into the merge list. In one alternative example, the method may be applied after a merge list is constructed, and the candidate is pruned from the list if one of the above conditions is met.

In one another example, the methods can be applied to TM refinement candidates, BM refinement candidates, MMVD candidates, and the candidates to be reordered by ARMC to prune the candidates if the candidates meet one of the above conditions.

In another example, the bi-prediction is transformed to uni-prediction by removing the list LX if LX has more OOB pixels than L(1−X).

In another example, the methods can be applied to TM refinement candidates, BM refinement candidates, MMVD candidates, and the candidates to be reordered by ARMC to transform a bi-prediction candidate into uni-prediction candidate by removing the list LX if LX has more OOB pixels than L(1-X).

Figure 16:
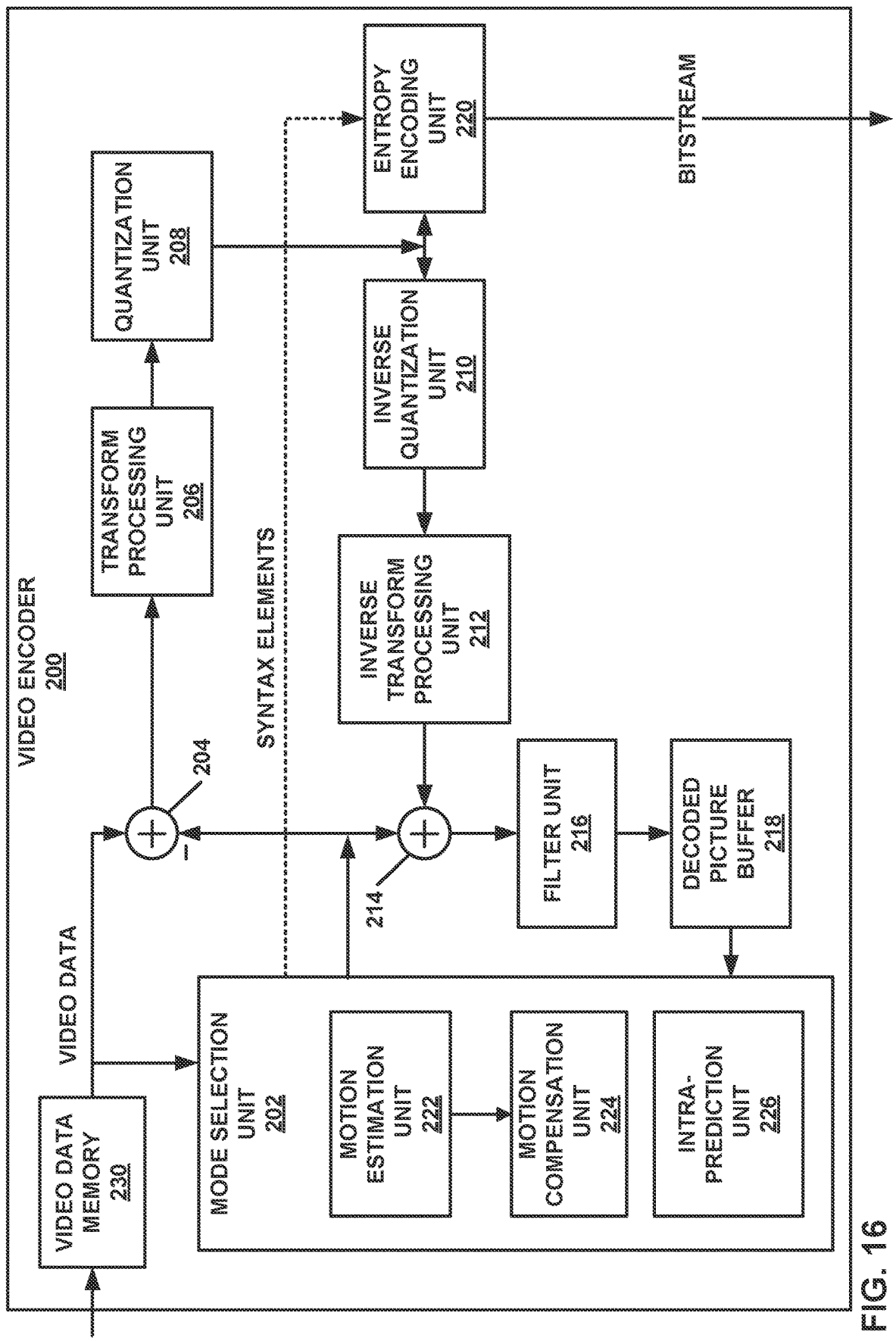
FIG. 16 is a block diagram illustrating an example video encoder that may perform the techniques of this disclosure.

FIG. 16 is a block diagram illustrating an example video encoder 200 that may perform the techniques of this disclosure. FIG. 16 is provided for purposes of explanation and should not be considered limiting of the techniques as broadly exemplified and described in this disclosure. For purposes of explanation, this disclosure describes video encoder 200 according to the techniques of VVC (ITU-T H.266, under development) and HEVC (ITU-T H.265). However, the techniques of this disclosure may be performed by video encoding devices that are configured to other video coding standards and video coding formats, such as AV1 and successors to the AV1 video coding format.

In the example of FIG. 16, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 16 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

Motion compensation unit 224 may further perform any or all of the techniques of this disclosure related to modifying a motion vector when the motion vector points to a block that is partially or fully out of bounds of a reference picture, as discussed above.

For example, motion compensation unit 224 may determine that a block of video data is to be predicted using bi-directional optical flow (BDOF), per the techniques of this disclosure. Mode selection unit 202 may perform a test of BDOF and determine, using a rate-distortion (RD) analysis, that when the block is predicted using BDOF, resulting performance is improved relative to not using BDOF. Thus, mode selection unit 202 may cause motion compensation unit 224 to perform BDOF. In addition, mode selection unit 202 may provide values for one or more syntax elements to entropy encoding unit 220 to enable BDOF for the block of video data.

Initially, motion estimation unit 222 may form two motion vectors for the block of video data, a motion vector referring to list 0 and a motion vector referring to list 1. Motion compensation unit 224 may receive the initial motion vectors for the block from motion estimation unit 222, then perform BDOF to refine the motion vectors. For example, motion compensation unit 224 may use the motion vectors to form a first prediction block and second prediction block, respectively. Motion compensation unit 224 may combine the first and second prediction blocks according to BDOF, as discussed above. For example, for at least one sample location of the prediction block, motion compensation unit 224 may determine that a first predictor is outside of a boundary of a first reference picture (e.g., included in list 0) and that a second predictor is within a boundary of a second reference picture (e.g., included in list 1). Thus, motion compensation unit may set the value of the first predictor equal to the second predictor, then perform the BDOF techniques as discussed above. That is, assuming the first predictor is $I^{(0)}(x, y)$ and the second predictor is $I^{(1)}(x, y)$, motion compensation unit 224 may calculate the value for the sample at the location of the prediction block according to:

$$\text{pred}_{BDOF}(x,y)=(I^{(1)}(x,y)+I^{(1)}(x,y)+b(x,y)+o_{offset})\gg \text{shift5}.$$

On the other hand, if the first predictor were $I^{(1)}(x, y)$ and the second were $I^{(0)}(x, y)$, motion compensation unit 224 may calculate the value for the sample at the location of the prediction block according to:

$$\text{pred}_{BDOF}(x,y)=(I^{(0)}(x,y)+I^{(0)}(x,y)+b(x,y)+o_{offset})\gg \text{shift5}.$$

In some examples, motion compensation unit 224 may determine when an initial version of a motion vector refers to an area outside of a boundary of a reference picture. In response to this determination, motion compensation unit 224 may modify the initial version of the motion vector to form a final version of the motion vector that refers to a portion of the reference picture that is within the boundary of the reference picture. Motion compensation unit 224 may then store the final version of the motion vector as stored motion information for the block. In this manner, the final, modified version of the motion vector may be used as a candidate motion vector predictor when predicting motion information for a subsequent (e.g., neighboring) block.

In some examples, motion compensation unit 224 may generate a first prediction block using a first motion vector and a second prediction block using a second motion vector. Motion compensation unit 224 may determine whether the first motion vector and the second motion vector refer to portions of respective reference pictures that re entirely within boundaries of the reference pictures. If so, motion compensation unit 224 may combine the first prediction block with the second prediction block to form a final prediction block. On the other hand, if the first motion vector refers to an OOB area of the corresponding reference picture, motion compensation unit 224 may treat the second prediction block as the final prediction block.

In some examples, motion compensation unit 224 may calculate gradients for performing prediction refinement with optical flow (PROF). In response to determining that at least one sample of the second block has a motion vector that points to a position outside of a reference picture boundary, motion compensation unit 224 may set one of the gradients for the at least one sample equal to zero.

In some examples, motion compensation unit 224 may generate a first predictor using motion information for a block. Motion compensation unit 224 may generate a second predictor using motion information for a neighboring block to the block, where the motion information for the neighboring block includes two motion vectors. In response to the two motion vectors of the motion information for the neighboring block both referring to reference blocks outside of respective reference pictures relative to the block, motion compensation unit 224 may discard the second predictor.

In some examples, when performing combined intra-inter prediction (CIIP) for a block, motion compensation unit 224 may generate a first predictor using intra-prediction and generate a second predictor using inter-prediction. Motion information for generating the second predictor may refer to a reference block outside of a boundary of a reference picture. In response, motion compensation unit 224 may generate a final predictor for the second block using the first predictor and the second predictor. In some examples motion compensation unit 224 may weight the first and second predictors such that the second predictor is weighted less than the first predictor and/or such that the second predictor is weighted less than if the motion information for generating the second predictor had referred to an entirely in-bounds portion of the reference picture.

When performing merge mode to encode motion information for a block, motion compensation unit 224 may determine, for a merge candidate, at least one of: that the merge candidate is a uni-prediction candidate and an entire reference block identified by the uni-prediction candidate is outside of a boundary of a reference picture; that the merge candidate is a uni-prediction candidate and at least a portion of a reference block identified by the uni-prediction candidate is outside of the boundary of the reference picture; that the merge candidate is a bi-prediction candidate and that entire reference blocks identified by the bi-prediction candidate are outside of respective boundaries of respective reference pictures for the bi-prediction candidate; or that the merge candidate is a bi-prediction candidate and that at least portions of reference blocks identified by the bi-prediction candidate are outside of respective boundaries of respective reference pictures for the bi-prediction candidate. If at least one of these conditions is true, then motion compensation unit 224 may skip addition of the merge candidate to a merge candidate list for the block.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 22 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Figure 17:
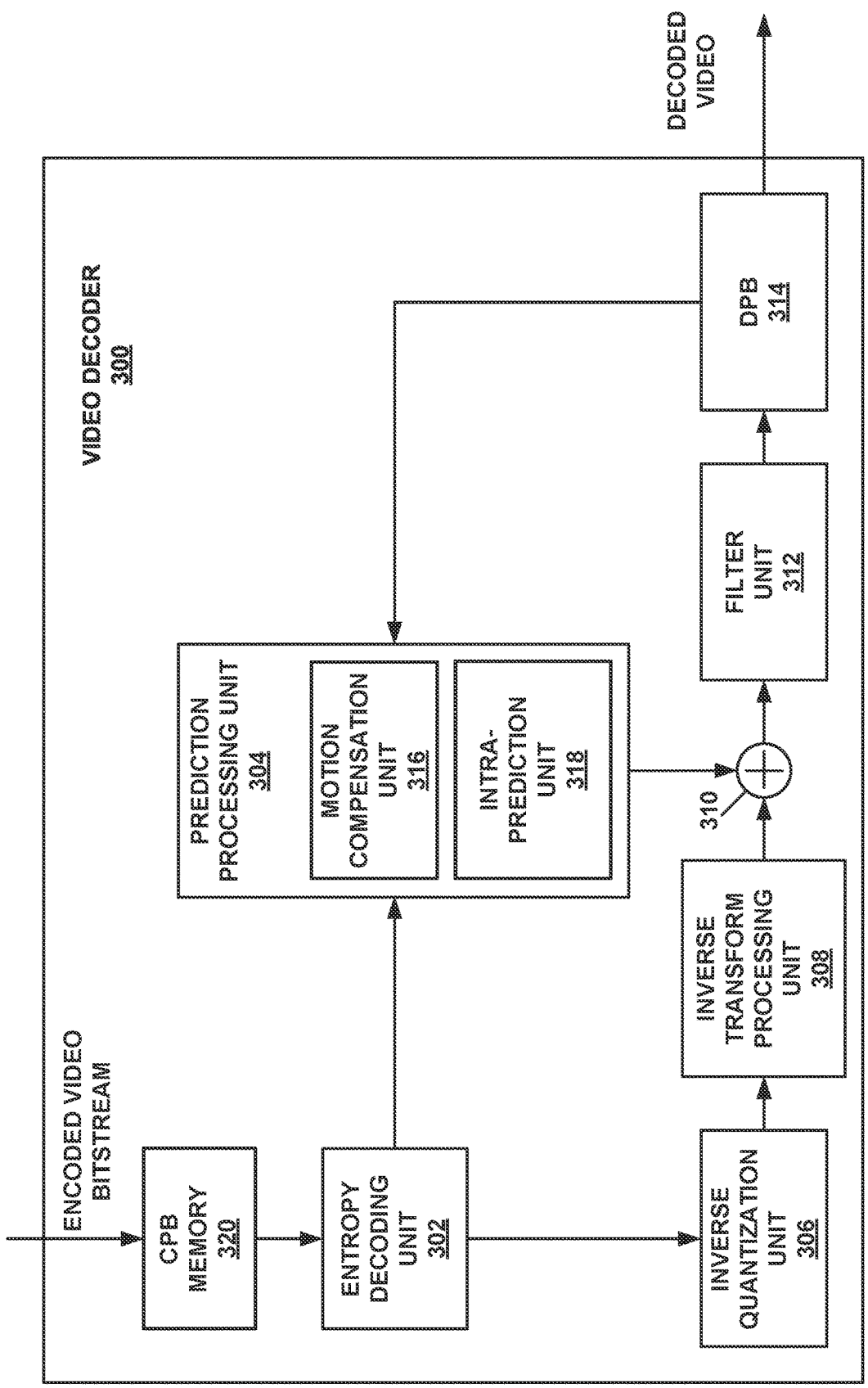
FIG. 17 is a block diagram illustrating an example video decoder that may perform the techniques of this disclosure.

FIG. 17 is a block diagram illustrating an example video decoder 300 that may perform the techniques of this disclosure. FIG. 17 is provided for purposes of explanation and is not limiting on the techniques as broadly exemplified and described in this disclosure. For purposes of explanation, this disclosure describes video decoder 300 according to the techniques of VVC (ITU-T H.266, under development) and HEVC (ITU-T H.265). However, the techniques of this disclosure may be performed by video coding devices that are configured to other video coding standards.

In the example of FIG. 17, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 17 are illustrated to assist with understanding the operations performed by video decoder 300. The units may be implemented as fixed-function circuits, programmable circuits, or a combination thereof. Similar to FIG. 16, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 16). Motion compensation unit 316 may perform any or all of the techniques of this disclosure related to modifying a motion vector when the motion vector points to a block that is partially or fully out of bounds of a reference picture, as discussed above.

For example, motion compensation unit 316 may determine that a block of video data is to be predicted using bi-directional optical flow (BDOF), per the techniques of this disclosure. That is, entropy decoding unit 302 may decode one or more syntax elements indicating that the block of video data is to be predicting using BDOF, and provide data representative of the use of BDOF to motion compensation unit 316, along with values for the motion information. The values for the motion information may include, for example, merge indexes for forming motion vectors or advanced motion vector prediction (AMVP) indexes, offsets, reference picture list identifiers, and reference picture indexes for forming the motion vectors. Motion compensation unit 316 may use the values of the syntax elements to form two motion vectors for the block of video data.

Motion compensation unit 316 may then perform BDOF to refine the motion vectors. For example, motion compensation unit 316 may use the motion vectors to form a first prediction block and second prediction block, respectively. Motion compensation unit 316 may combine the first and second prediction blocks according to BDOF, as discussed above. For example, for at least one sample location of the prediction block, motion compensation unit 316 may determine that a first predictor is outside of a boundary of a first reference picture (e.g., included in list 0) and that a second predictor is within a boundary of a second reference picture (e.g., included in list 1). Thus, motion compensation unit may set the value of the first predictor equal to the second predictor, then perform the BDOF techniques as discussed above. That is, assuming the first predictor is $I^{(0)}(x, y)$ and the second predictor is $JI)(x, y)$, motion compensation unit 316 may calculate the value for the sample at the location of the prediction block according to:

$$pred_{BDOF}(x,y)=(I^{(1)}(x,y)+I^{(1)}(x,y)+b(x,y)+o_{offset})\gg shift5.$$

On the other hand, if the first predictor were $JI)(x, y)$ and the second were $I^{(0)}(x, y)$, motion compensation unit 316 may calculate the value for the sample at the location of the prediction block according to:

$$pred_{BDOF}(x,y)=(I^{(0)}(x,y)+I^{(0)}(x,y)+b(x,y)+o_{offset})\gg shift5.$$

In some examples, motion compensation unit 316 may determine when an initial version of a motion vector refers to an area outside of a boundary of a reference picture. In response to this determination, motion compensation unit 316 may modify the initial version of the motion vector to form a final version of the motion vector that refers to a portion of the reference picture that is within the boundary of the reference picture. Motion compensation unit 316 may then store the final version of the motion vector as stored motion information for the block. In this manner, the final, modified version of the motion vector may be used as a candidate motion vector predictor when predicting motion information for a subsequent (e.g., neighboring) block.

In some examples, motion compensation unit 316 may generate a first prediction block using a first motion vector and a second prediction block using a second motion vector. Motion compensation unit 316 may determine whether the first motion vector and the second motion vector refer to portions of respective reference pictures that re entirely within boundaries of the reference pictures. If so, motion compensation unit 316 may combine the first prediction block with the second prediction block to form a final prediction block. On the other hand, if the first motion vector refers to an OOB area of the corresponding reference picture, motion compensation unit 316 may treat the second prediction block as the final prediction block.

In some examples, motion compensation unit 316 may calculate gradients for performing prediction refinement with optical flow (PROF). In response to determining that at least one sample of the second block has a motion vector that points to a position outside of a reference picture boundary, motion compensation unit 316 may set one of the gradients for the at least one sample equal to zero.

In some examples, motion compensation unit 316 may generate a first predictor using motion information for a block. Motion compensation unit 316 may generate a second predictor using motion information for a neighboring block to the block, where the motion information for the neighboring block includes two motion vectors. In response to the two motion vectors of the motion information for the neighboring block both referring to reference blocks outside of respective reference pictures relative to the block, motion compensation unit 316 may discard the second predictor.

In some examples, when performing combined intra-inter prediction (CIIP) for a block, motion compensation unit 316 may generate a first predictor using intra-prediction and generate a second predictor using inter-prediction. Motion information for generating the second predictor may refer to a reference block outside of a boundary of a reference picture. In response, motion compensation unit 316 may generate a final predictor for the second block using the first predictor and the second predictor. In some examples motion compensation unit 316 may weight the first and second predictors such that the second predictor is weighted less than the first predictor and/or such that the second predictor is weighted less than if the motion information for generating the second predictor had referred to an entirely in-bounds portion of the reference picture.

When performing merge mode to encode motion information for a block, motion compensation unit 316 may determine, for a merge candidate, at least one of: that the merge candidate is a uni-prediction candidate and an entire reference block identified by the uni-prediction candidate is outside of a boundary of a reference picture; that the merge candidate is a uni-prediction candidate and at least a portion of a reference block identified by the uni-prediction candidate is outside of the boundary of the reference picture; that the merge candidate is a bi-prediction candidate and that entire reference blocks identified by the bi-prediction candidate are outside of respective boundaries of respective reference pictures for the bi-prediction candidate; or that the merge candidate is a bi-prediction candidate and that at least portions of reference blocks identified by the bi-prediction candidate are outside of respective boundaries of respective reference pictures for the bi-prediction candidate. If at least one of these conditions is true, then motion compensation unit 316 may skip addition of the merge candidate to a merge candidate list for the block.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 16). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

Figure 18:
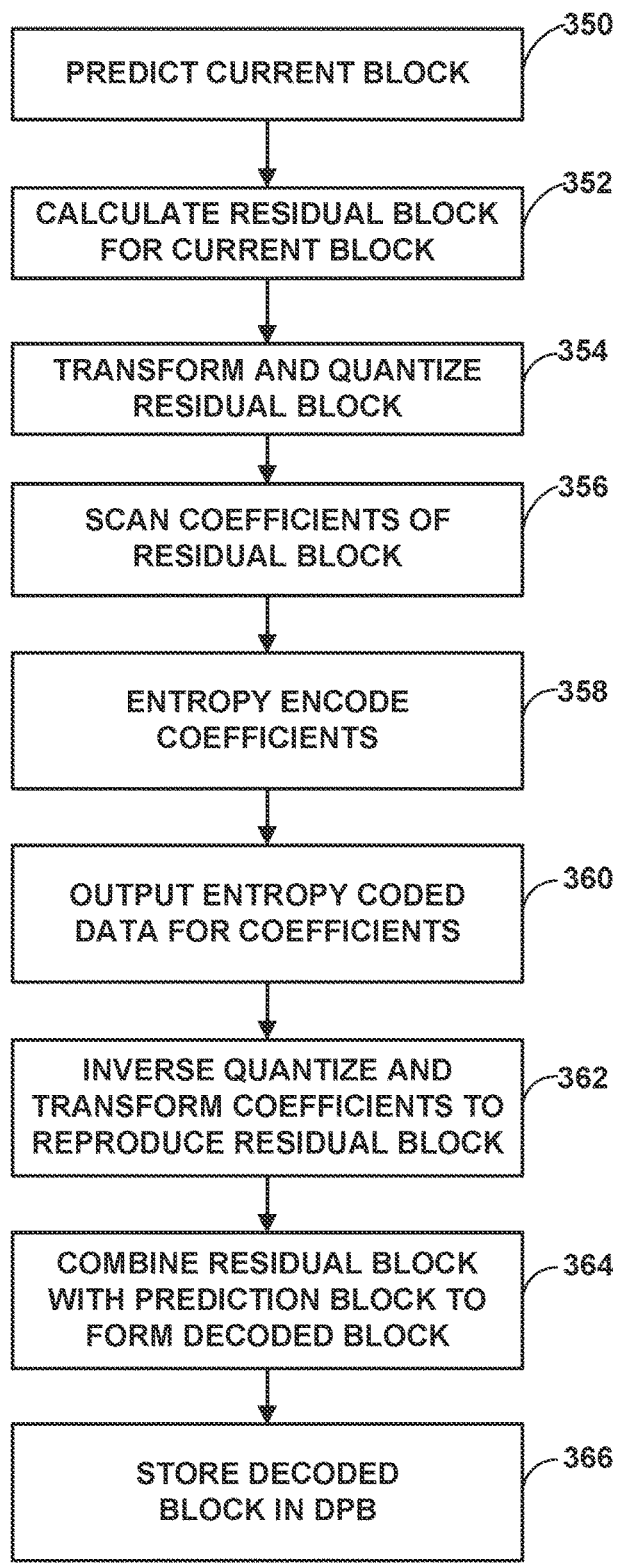
FIG. 18 is a flowchart illustrating an example method for encoding a current block in accordance with the techniques of this disclosure.

FIG. 18 is a flowchart illustrating an example method for encoding a current block in accordance with the techniques of this disclosure. The current block may comprise a current CU. Although described with respect to video encoder 200

(FIGS. 1 and 16), it should be understood that other devices may be configured to perform a method similar to that of FIG. 18.

In this example, video encoder 200 initially predicts the current block (350). For example, video encoder 200 may form a prediction block for the current block. Formation of the prediction block may include modification of a motion vector that refers to a block that is partially or fully out of bounds of a reference picture according to any of the various techniques of this disclosure. Video encoder 200 may then calculate a residual block for the current block (352). To calculate the residual block, video encoder 200 may calculate a difference between the original, uncoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Video encoder 200 may also decode the current block after encoding the current block, to use the decoded version of the current block as reference data for subsequently coded data (e.g., in inter- or intra-prediction modes). Thus, video encoder 200 may inverse quantize and inverse transform the coefficients to reproduce the residual block (362). Video encoder 200 may combine the residual block with the prediction block to form a decoded block (364). Video encoder 200 may then store the decoded block in DPB 218 (366).

Figure 19:
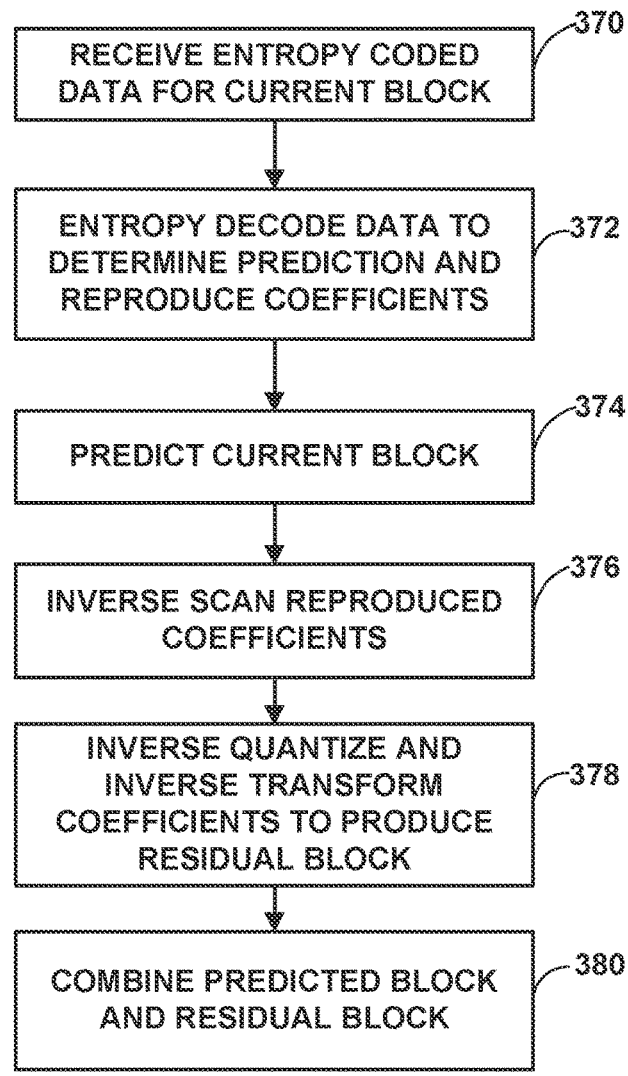
FIG. 19 is a flowchart illustrating an example method for decoding a current block in accordance with the techniques of this disclosure.

FIG. 19 is a flowchart illustrating an example method for decoding a current block of video data in accordance with the techniques of this disclosure. The current block may comprise a current CU. Although described with respect to video decoder 300 (FIGS. 1 and 17), it should be understood that other devices may be configured to perform a method similar to that of FIG. 19.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Formation of the prediction block may include modification of a motion vector that refers to a block that is partially or fully out of bounds of a reference picture according to any of the various techniques of this disclosure. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Figure 20:
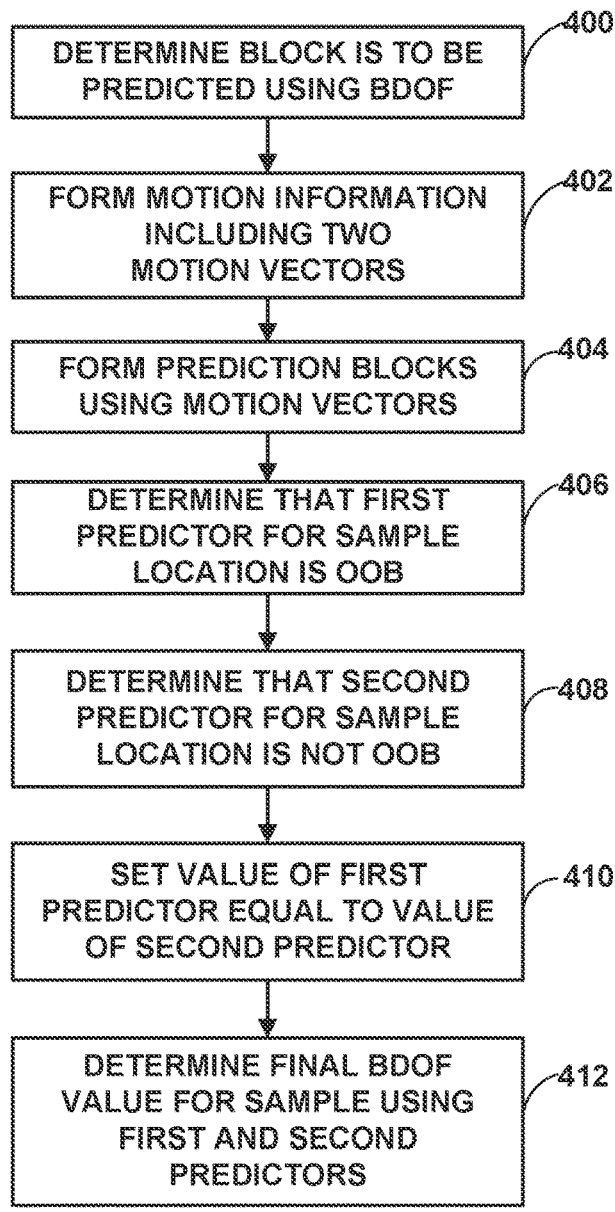
FIG. 20 is a flowchart illustrating an example method of encoding a block of video data using bi-directional optical flow (BDOF) according to the techniques of this disclosure.

FIG. 20 is a flowchart illustrating an example method of encoding a block of video data using bi-directional optical flow (BDOF) according to the techniques of this disclosure. The method of FIG. 20 is explained with respect to video decoder 300 for purposes of example. However, the method of FIG. 20 may also be performed by video encoder 200 or other encoding and/or decoding devices. The method of FIG. 20 may be performed as part of step 350 of the method of FIG. 18 or of step 374 of the method of FIG. 19.

Initially, video decoder 300 may determine that a block is to be predicted using BDOF (400). For example, video decoder 300 may receive values for one or more syntax elements for a block indicating that the block is to be predicted using BDOF. Video decoder 300 may also form motion information including two motion vectors for the block (402). For example, video decoder 300 may receive merge mode information or AMVP information and use the received information to generate a first motion vector and a second motion vector for the block.

Video decoder 300 may then form prediction blocks using the motion vectors (404). The motion vectors may refer to portions of respective reference pictures that are fully or partially within boundaries of the reference pictures. If a motion vector refers to a portion that is partially outside of a boundary of the corresponding reference picture, video decoder 300 may use padding to determine values for the prediction block or may update the motion vector to refer to a portion of the reference picture that is entirely within the boundaries of the reference picture. In the case of updating the motion vector, video decoder 300 may store the updated motion vector for use as a candidate motion vector predictor for subsequently coded motion information.

Video decoder 300 may next combine the two prediction blocks according to BDOF. In particular, according to the techniques of this disclosure, video decoder 300 may determine that a first predictor for a sample location of a final prediction block is out of bounds (OOB) of a reference picture for the first motion vector (406) and that a second predictor for the sample location is not OOB of a reference picture for the second motion vector (408). In this case, video decoder 300 sets the value of the first predictor equal to the value of the second predictor (410). Video decoder 300 may then determine the final BDOF value for the sample at the location using the first and second predictors. For example, assuming the first predictor is $I^{(0)}(x, y)$ and the second predictor is $I^{(1)}(x, y)$ of equation (1-6-6) above, video decoder 300 may calculate the value for the sample at location (x, y) of the prediction block according to:

$$\text{pred}_{BDOF}(x,y)=(I^{(1)}(x,y)+I^{(1)}(x,y)+b(x,y)+o_{\mathit{offset}})\text{»shift5}.$$

On the other hand, if the first predictor were $I^1(x, y)$ and the second were $I^{(0)}(x, y)$, video decoder 300 may calculate the value for the sample at the location of the prediction block according to:

$$\text{pred}_{BDOF}(x,y)=(I^{(0)}(x,y)+I^{(0)}(x,y)+b(x,y)+o_{\mathit{offset}})\text{shift5}.$$

In this manner, the method of FIG. 20 represents an example of a method including determining that a block of video data is to be predicted using bi-directional optical flow (BDOF); forming motion information for the block, the motion information including a first motion vector referring to a first picture of a first reference picture list and a second motion vector referring to a second reference picture of a second reference picture list; forming a first prediction block using the first motion vector and a second prediction block using the second motion vector; combining the first prediction block with the second prediction block according to BDOF to form a final prediction block, wherein for at least one sample location of the final prediction block, the method includes: determining that a first predictor for the at least one sample location is outside of a boundary of the first reference picture; determining that a second predictor for the at least one sample location is within a boundary of the second reference picture; setting the first predictor equal to the second predictor; and determining a final BDOF value for a sample at the at least one sample location using the first predictor and the second predictor.

Various examples of the techniques of this disclosure are summarized in the following clauses:

Clause 1: A method of decoding video data, the method comprising: decoding motion information for a current block of video data; determining that the motion information refers to a portion of a reference picture that is outside of a boundary of the reference picture; and in response to determining that the motion information refers to the portion of the reference picture that is outside of the boundary of the reference picture: modifying the motion information to form second motion information that points to a second portion of the reference picture this is within the boundary of the reference picture; and storing the second motion information as stored motion information for the current block.

Clause 2: The method of clause 1, further comprising predicting motion information for a second, different block using the stored motion information for the current block.

Clause 3: A method of decoding video data, the method comprising: determining whether an initial motion vector of a current block refers to a portion of a reference picture that is outside of a boundary of the reference picture; and in response to determining that the initial motion vector of the current block refers to the portion of the reference picture that is outside of the boundary of the reference picture, skipping performance of decoder-side motion vector refinement for the initial motion vector.

Clause 4: A method comprising a combination of the method of any of clauses 1 and 2 and the method of clause 3.

Clause 5: A method of decoding video data, the method comprising: determining that a first predictor for a pixel location is outside of a boundary of a reference picture for a current block; determining that a second predictor for a pixel location is within the boundary of the reference picture for the current block; setting the first predictor equal to the second predictor; and performing bi-directional optical flow (BDOF).

Clause 6: A method comprising a combination of the method of any of clauses 1-4 and the method of clause 5.

Clause 7: A method of decoding video data, the method comprising: while calculating gradients for prediction refinement with optical flow (PROF), determining that a motion vector for a pixel of a current block refers to a portion of a reference picture that is outside of a boundary of the reference picture; and in response to determining that the motion vector for the pixel of the current block refers to the portion of the reference picture that is outside of a boundary of the reference picture, setting the value of the gradients for the pixel equal to zero.

Clause 8: A method comprising a combination of the method of any of clauses 1-6 and the method of clause 7.

Clause 9: A method of decoding video data, the method comprising:

determining, for a merge candidate, at least one of: that the merge candidate is a uni-prediction candidate and an entire reference block identified by the uni-prediction candidate is outside of a boundary of a reference picture; that the merge candidate is a uni-prediction candidate and at least a portion of a reference block identified by the uni-prediction candidate is outside of the boundary of the reference picture; that the merge candidate is a bi-prediction candidate and that entire reference blocks identified by the bi-prediction candidate are outside of respective boundaries of respective reference pictures for the bi-prediction candidate; or that the merge candidate is a bi-prediction candidate and that at least portions of reference blocks identified by the bi-prediction candidate are outside of respective boundaries of respective reference pictures for the bi-prediction candidate, and in response to the determination, skipping addition of the merge candidate to a merge candidate list for a current block.

Clause 10: A method comprising a combination of the method of any of clauses 1-8 and the method of clause 9.

Clause 11: The method of any of clauses 1-10, further comprising encoding the current block prior to decoding the current block.

Clause 12: A device for decoding video data, the device comprising one or more means for performing the method of any of clauses 1-11.

Clause 13: The device of clause 12, further comprising a display configured to display the decoded video data.

Clause 14: The device of any of clauses 12-13, wherein the device comprises one or more of a camera, a computer, a mobile device, a broadcast receiver device, or a set-top box.

Clause 15: The device of clause 12-14, further comprising a memory configured to store the video data.

Clause 16: A computer-readable storage medium having stored thereon instructions that, when executed, cause a processor of a device for decoding video data to perform the method of any of clauses 1-11.

Clause 17: A method of decoding video data, the method comprising:

determining that a block of video data is to be predicted using bi-directional optical flow (BDOF); forming motion information for the block, the motion information including a first motion vector referring to a first picture of a first reference picture list and a second motion vector referring to a second reference picture of a second reference picture list; forming a first prediction block using the first motion vector and a second prediction block using the second motion vector; combining the first prediction block with the second prediction block according to BDOF to form a final prediction block, wherein for at least one sample location of the final prediction block, the method includes: determining that a first predictor for the at least one sample location is outside of a boundary of the first reference picture; determining that a second predictor for the at least one sample location is within a boundary of the second reference picture; setting the first predictor equal to the second predictor; and determining a final BDOF value for a sample at the at least one sample location using the first predictor and the second predictor.

Clause 18: The method of clause 17, wherein the sample location comprises (x, y), the first predictor comprises $I^{(0)}(x, y)$, the second predictor comprises $I^{(1)}(x, y)$, b(x, y) comprises an adjustment value, and $O_{offset}$ comprises an offset value.

Clause 19: The method of clause 18, wherein determining the final BDOF value for the sample at the at least one sample location comprises calculating the final BDOF value for the sample according to $(I^{(1)}(x, y)+I^{(1)}(x, y)+b(x, y)+o_{offset})\text{>>shift5}$, wherein ">>" comprises a bitwise right shift operator and shift5 is equal to Max(3, 15 −BitDepth), wherein Max(x, y) returns a maximum between x and y, and wherein BitDepth represents a bit depth of a video bitstream including the block of video data.

Clause 20: The method of clause 18, further comprising determining the adjustment value according to $$b(x, y) = v_x \cdot \left(\frac{\partial I^{(1)}(x, y)}{\partial x} - \frac{\partial I^{(0)}(x, y)}{\partial x}\right) + v_y \cdot \left(\frac{\partial I^{(1)}(x, y)}{\partial y} - \frac{\partial I^{(0)}(x, y)}{\partial y}\right), \quad (1)$$

wherein $$\frac{\partial I^{(1)}(x, y)}{\partial x}$$

comprises a horizontal gradient for the second predictor, $$\frac{\partial I^{(0)}(x, y)}{\partial x}$$

comprises a horizontal gradient for the first predictor, $$\frac{\partial I^{(1)}(x, y)}{\partial y}$$

comprises a vertical gradient for the second predictor, $$\frac{\partial I^{(0)}(x, y)}{\partial y}$$

comprises a vertical gradient for the first predictor, $v_x$ comprises a horizontal component of a refinement vector, and $v_y$ comprises a vertical component of the refinement vector.

Clause 21: The method of clause 17, wherein the first predictor is included in a first N×N window, N being a positive integer value, and wherein the second predictor is included in a second N×N window.

Clause 22: The method of clause 21, wherein the block comprises an M×M sub-block of a parent block of video data, M being a positive integer value less than N.

Clause 23: The method of clause 21, wherein when at least one sample of the first N×N window is outside of the boundary of the first reference picture or at least one sample of the second N×N window is outside of the boundary of the second reference picture, combining the first prediction block with the second prediction block comprises setting gradient values equal to zero.

Clause 24: The method of clause 17, wherein forming the first motion vector comprises: determining that an initial version of the first motion vector refers to an area that is outside of a boundary of the first reference picture; in response to determining that the first motion information refers to the area that is outside of the boundary of the first reference picture: modifying the initial version of the first motion vector to form a final version of the first motion vector that refers to a portion of the first reference picture that is within the boundary of the first reference picture; and storing the final version of the first motion vector as stored motion information for the block.

Clause 25: The method of clause 24, further comprising predicting motion information for a second, different block using the stored motion information for the block.

Clause 26: The method of clause 17, wherein combining the first prediction block with the second prediction block comprises combining the first prediction block with the second prediction block after determining both that the first motion vector refers to a portion of the first reference picture that is entirely within boundaries of the first reference picture and that the second motion vector refers to a portion of the second reference picture that is entirely within boundaries of the second reference picture.

Clause 27: The method of clause 17, wherein the block comprises a first block, the method further comprising, for a second block of the video data: calculating gradients for performing prediction refinement with optical flow (PROF); determining that at least one sample of the second block has a motion vector that points to a position outside of a reference picture boundary; and setting one of the gradients for the at least one sample equal to zero.

Clause 28: The method of clause 17, wherein the block comprises a first block, the method further comprising, for a second block of the video data: generating a first predictor using motion information for the second block; generating a second predictor using motion information for a neighboring block to the second block, the motion information for the neighboring block including two motion vectors; in response to the two motion vectors of the motion information for the neighboring block both referring to reference blocks outside of respective reference pictures relative to the second block, discarding the second predictor.

Clause 29: The method of clause 17, wherein the block comprises a first block, the method further comprising, for a second block of the video data: generating a first predictor using intra-prediction; generating a second predictor using inter-prediction, wherein motion information for generating the second predictor refers to a reference block outside of a boundary of a reference picture; and generating a final predictor for the second block using the first predictor and the second predictor.

Clause 30: The method of clause 29, wherein generating the final predictor comprises applying a first weight to the first predictor and a second weight to the second predictor, the second weight being less than a third weight that is used when the motion information refers to a reference block fully within the boundary of the reference picture.

Clause 31: The method of clause 17, wherein forming the motion information comprises forming at least one of the first motion vector or the second motion vector using merge mode, and wherein forming the at least one of the first motion vector or the second motion vector using merge mode comprises: determining, for a merge candidate, at least one of: that the merge candidate is a uni-prediction candidate and an entire reference block identified by the uni-prediction candidate is outside of a boundary of a reference picture; that the merge candidate is a uni-prediction candidate and at least a portion of a reference block identified by the uni-prediction candidate is outside of the boundary of the reference picture; that the merge candidate is a bi-prediction candidate and that entire reference blocks identified by the bi-prediction candidate are outside of respective boundaries of respective reference pictures for the bi-prediction candidate; or that the merge candidate is a bi-prediction candidate and that at least portions of reference blocks identified by the bi-prediction candidate are outside of respective boundaries of respective reference pictures for the bi-prediction candidate, and in response to the determination, skipping addition of the merge candidate to a merge candidate list for a current block.

Clause 32: The method of clause 17, further comprising encoding the current block prior to decoding the current block.

Clause 33: A device for decoding video data, the device comprising: a memory configured to store video data; and one or more processors implemented in circuitry and configured to: determine that a block of the video data is to be predicted using bi-directional optical flow (BDOF); form motion information for the block, the motion information including a first motion vector referring to a first picture of a first reference picture list and a second motion vector referring to a second reference picture of a second reference picture list; form a first prediction block using the first motion vector and a second prediction block using the second motion vector; combine the first prediction block with the second prediction block according to BDOF to form a final prediction block, wherein for at least one sample location of the final prediction block, the one or more processors are configured to: determine that a first predictor for the at least one sample location is outside of a boundary of the first reference picture; determine that a second predictor for the at least one sample location is within a boundary of the second reference picture; set the first predictor equal to the second predictor; and determine a final BDOF value for a sample at the at least one sample location using the first predictor and the second predictor.

Clause 34: The device of clause 33, wherein the sample location comprises (x, y), the first predictor comprises $I^{(0)}(x, y)$, the second predictor comprises $I^{(1)}(x, y)$, $b(x, y)$ comprises an adjustment value, and $O_{offset}$ comprises an offset value.

Clause 35: The device of clause 34, wherein to determine the final BDOF value for the sample at the at least one sample location, the one or more processors are configured to calculate the final BDOF value for the sample according to $(I^{(1)}(x, y)+I^{(1)}(x, y)+b(x, y)+o_{offset})$ »shift5, wherein ">>" comprises a bitwise right shift operator and shift5 is equal to Max(3, 15−BitDepth), wherein Max(x, y) returns a maximum between x and y, and wherein BitDepth represents a bit depth of a video bitstream including the block of video data.

Clause 36: The device of clause 34, wherein the one or more processors are further configured to determine the adjustment value according to $$b(x, y) = v_x \cdot \left( \frac{\partial I^{(1)}(x, y)}{\partial x} - \frac{\partial I^{(0)}(x, y)}{\partial x} \right) + v_y \cdot \left( \frac{\partial I^{(1)}(x, y)}{\partial y} - \frac{\partial I^{(0)}(x, y)}{\partial y} \right),$$

wherein $$\frac{\partial I^{(1)}(x, y)}{\partial x}$$

comprises a horizontal gradient for the second predictor, $$\frac{\partial I^{(0)}(x, y)}{\partial x}$$

comprises a horizontal gradient for the first predictor, $$\frac{\partial I^{(1)}(x, y)}{\partial y}$$

comprises a vertical gradient for the second predictor, $$\frac{\partial I^{(0)}(x, y)}{\partial y}$$

comprises a vertical gradient for the first predictor, $v_x$ comprises a horizontal component of a refinement vector, and $v_y$ comprises a vertical component of the refinement vector.

Clause 37: The device of clause 33, wherein the first predictor is included in a first N×N window, N being a positive integer value, and wherein the second predictor is included in a second N×N window.

Clause 38: The device of clause 37, wherein the block comprises an M×M sub-block of a parent block of video data, M being a positive integer value less than N.

Clause 39: The device of clause 37, wherein when at least one sample of the first N×N window is outside of the boundary of the first reference picture or at least one sample of the second N×N window is outside of the boundary of the second reference picture, combining the first prediction block with the second prediction block comprises setting gradient values equal to zero.

Clause 40: The device of clause 33, wherein the one or more processors are further configured to encode the block before decoding the block.

Clause 41: The device of clause 33, further comprising a display configured to display the decoded video data.

Clause 42: The device of clause 33, wherein the device comprises one or more of a camera, a computer, a mobile device, a broadcast receiver device, or a set-top box.

Clause 43: A device for decoding video data, the device comprising: means for determining that a block of video data is to be predicted using bi-directional optical flow (BDOF); means for forming motion information for the block, the motion information including a first motion vector referring to a first picture of a first reference picture list and a second motion vector referring to a second reference picture of a second reference picture list; means for forming a first prediction block using the first motion vector and a second prediction block using the second motion vector; means for combining the first prediction block with the second prediction block according to BDOF to form a final prediction block; means for determining that a first predictor for at least one sample location of the final prediction block is outside of a boundary of the first reference picture; means for determining that a second predictor for the at least one sample location is within a boundary of the second reference picture; means for setting the first predictor equal to the second predictor; and means for determining a final BDOF value for a sample at the at least one sample location using the first predictor and the second predictor.

Clause 44: A method of decoding video data, the method comprising: determining that a block of video data is to be predicted using bi-directional optical flow (BDOF); forming motion information for the block, the motion information including a first motion vector referring to a first picture of a first reference picture list and a second motion vector referring to a second reference picture of a second reference picture list; forming a first prediction block using the first motion vector and a second prediction block using the second motion vector; combining the first prediction block with the second prediction block according to BDOF to form a final prediction block, wherein for at least one sample location of the final prediction block, the method includes: determining that a first predictor for the at least one sample location is outside of a boundary of the first reference picture; determining that a second predictor for the at least one sample location is within a boundary of the second reference picture; setting the first predictor equal to the second predictor; and determining a final BDOF value for a sample at the at least one sample location using the first predictor and the second predictor.

Clause 45: The method of clause 44, wherein the sample location comprises (x, y), the first predictor comprises $I^{(0)}(x, y)$, the second predictor comprises $I^{(1)}(x, y)$, $b(x, y)$ comprises an adjustment value, and $O_{offset}$ comprises an offset value.

Clause 46: The method of clause 45, wherein determining the final BDOF value for the sample at the at least one sample location comprises calculating the final BDOF value for the sample according to $(I^{(1)}(x, y)+I^{(1)}(x, y)+b(x, y)+o_{offset})\gg shift5$, wherein ">>" comprises a bitwise right shift operator and shift5 is equal to Max(3, 15−BitDepth), wherein Max(x, y) returns a maximum between x and y, and wherein BitDepth represents a bit depth of a video bitstream including the block of video data.

Clause 47: The method of any of clauses 45 and 46, further comprising determining the adjustment value according to $$b(x, y) = v_x \cdot \left(\frac{\partial I^{(1)}(x, y)}{\partial x} - \frac{\partial I^{(0)}(x, y)}{\partial x}\right) + v_y \cdot \left(\frac{\partial I^{(1)}(x, y)}{\partial y} - \frac{\partial I^{(0)}(x, y)}{\partial y}\right),$$

wherein $$\frac{\partial I^{(1)}(x, y)}{\partial x}$$

comprises a horizontal gradient for the second predictor, $$\frac{\partial I^{(0)}(x, y)}{\partial x}$$

comprises a horizontal gradient for the first predictor, $$\frac{\partial I^{(1)}(x, y)}{\partial y}$$

comprises a vertical gradient for the second predictor, $$\frac{\partial I^{(0)}(x, y)}{\partial y}$$

comprises a vertical gradient for the first predictor, $v_x$ comprises a horizontal component of a refinement vector, and $v_y$ comprises a vertical component of the refinement vector.

Clause 48: The method of any of clauses 44-47, wherein the first predictor is included in a first N×N window, N being a positive integer value, and wherein the second predictor is included in a second N×N window.

Clause 49: The method of clause 48, wherein the block comprises an M×M sub-block of a parent block of video data, M being a positive integer value less than N.

Clause 50: The method of any of clauses 48 and 49, wherein when at least one sample of the first N×N window is outside of the boundary of the first reference picture or at least one sample of the second N×N window is outside of the boundary of the second reference picture, combining the first prediction block with the second prediction block comprises setting gradient values equal to zero.

Clause 51: The method of any of clauses 44-50, wherein forming the first motion vector comprises: determining that an initial version of the first motion vector refers to an area that is outside of a boundary of the first reference picture; in response to determining that the first motion information refers to the area that is outside of the boundary of the first reference picture: modifying the initial version of the first motion vector to form a final version of the first motion vector that refers to a portion of the first reference picture that is within the boundary of the first reference picture; and storing the final version of the first motion vector as stored motion information for the block.

Clause 52: The method of clause 51, further comprising predicting motion information for a second, different block using the stored motion information for the block.

Clause 53: The method of any of clauses 44-52, wherein combining the first prediction block with the second prediction block comprises combining the first prediction block with the second prediction block after determining both that the first motion vector refers to a portion of the first reference picture that is entirely within boundaries of the first reference picture and that the second motion vector refers to a portion of the second reference picture that is entirely within boundaries of the second reference picture.

Clause 54: The method of any of clauses 44-53, wherein the block comprises a first block, the method further comprising, for a second block of the video data: calculating gradients for performing prediction refinement with optical flow (PROF); determining that at least one sample of the second block has a motion vector that points to a position outside of a reference picture boundary; and setting one of the gradients for the at least one sample equal to zero.

Clause 55: The method of any of clauses 44-54, wherein the block comprises a first block, the method further comprising, for a second block of the video data: generating a first predictor using motion information for the second block; generating a second predictor using motion information for a neighboring block to the second block, the motion information for the neighboring block including two motion vectors; in response to the two motion vectors of the motion information for the neighboring block both referring to reference blocks outside of respective reference pictures relative to the second block, discarding the second predictor.

Clause 56: The method of any of clauses 44-55, wherein the block comprises a first block, the method further comprising, for a second block of the video data: generating a first predictor using intra-prediction; generating a second predictor using inter-prediction, wherein motion information for generating the second predictor refers to a reference block outside of a boundary of a reference picture; and generating a final predictor for the second block using the first predictor and the second predictor.

Clause 57: The method of clause 56, wherein generating the final predictor comprises applying a first weight to the first predictor and a second weight to the second predictor, the second weight being less than a third weight that is used when the motion information refers to a reference block fully within the boundary of the reference picture.

Clause 58: The method of any of clauses 44-57, wherein forming the motion information comprises forming at least one of the first motion vector or the second motion vector using merge mode, and wherein forming the at least one of the first motion vector or the second motion vector using merge mode comprises: determining, for a merge candidate, at least one of: that the merge candidate is a uni-prediction candidate and an entire reference block identified by the uni-prediction candidate is outside of a boundary of a reference picture; that the merge candidate is a uni-prediction candidate and at least a portion of a reference block identified by the uni-prediction candidate is outside of the boundary of the reference picture; that the merge candidate is a bi-prediction candidate and that entire reference blocks identified by the bi-prediction candidate are outside of respective boundaries of respective reference pictures for the bi-prediction candidate; or that the merge candidate is a bi-prediction candidate and that at least portions of reference blocks identified by the bi-prediction candidate are outside of respective boundaries of respective reference pictures for the bi-prediction candidate, and in response to the determination, skipping addition of the merge candidate to a merge candidate list for a current block.

Clause 59: The method of any of clauses 44-58, further comprising encoding the current block prior to decoding the current block.

Clause 60: A device for decoding video data, the device comprising: a memory configured to store video data; and one or more processors implemented in circuitry and configured to: determine that a block of the video data is to be predicted using bi-directional optical flow (BDOF); form motion information for the block, the motion information including a first motion vector referring to a first picture of a first reference picture list and a second motion vector referring to a second reference picture of a second reference picture list; form a first prediction block using the first motion vector and a second prediction block using the second motion vector; combine the first prediction block with the second prediction block according to BDOF to form a final prediction block, wherein for at least one sample location of the final prediction block, the one or more processors are configured to: determine that a first predictor for the at least one sample location is outside of a boundary of the first reference picture; determine that a second predictor for the at least one sample location is within a boundary of the second reference picture; set the first predictor equal to the second predictor; and determine a final BDOF value for a sample at the at least one sample location using the first predictor and the second predictor.

Clause 61: The device of clause 60, wherein the sample location comprises (x, y), the first predictor comprises $I^{(0)}(x, y)$, the second predictor comprises $I^{(1)}(x, y)$, b(x, y) comprises an adjustment value, and $O_{offset}$ comprises an offset value.

Clause 62: The device of clause 61, wherein to determine the final BDOF value for the sample at the at least one sample location, the one or more processors are configured to calculate the final BDOF value for the sample according to $(I^{(1)}(x, y)+I^{(1)}(x, y)+b(x, y)+o_{offset})$ »shift5, wherein ">>" comprises a bitwise right shift operator and shift5 is equal to Max(3, 15−BitDepth), wherein Max(x, y) returns a maximum between x and y, and wherein BitDepth represents a bit depth of a video bitstream including the block of video data.

Clause 63: The device of any of clauses 61 and 62, wherein the one or more processors are further configured to determine the adjustment value according to $$b(x, y) = v_x \cdot \left(\frac{\partial I^{(1)}(x, y)}{\partial x} - \frac{\partial I^{(0)}(x, y)}{\partial x}\right) + v_y \cdot \left(\frac{\partial I^{(1)}(x, y)}{\partial y} - \frac{\partial I^{(0)}(x, y)}{\partial y}\right),$$

wherein $$\frac{\partial I^{(1)}(x, y)}{\partial x}$$

comprises a horizontal gradient for the second predictor, $$\frac{\partial I^{(0)}(x, y)}{\partial x}$$

comprises a horizontal gradient for the first predictor, $$\frac{\partial I^{(1)}(x, y)}{\partial y}$$

comprises a vertical gradient for the second predictor, $$\frac{\partial I^{(0)}(x, y)}{\partial y}$$

comprises a vertical gradient for the first predictor, $v_x$ comprises a horizontal component of a refinement vector, and $v_y$ comprises a vertical component of the refinement vector.

Clause 64: The device of any of clauses 60-63, wherein the first predictor is included in a first N×N window, N being a positive integer value, and wherein the second predictor is included in a second N×N window.

Clause 65: The device of clause 64, wherein the block comprises an M×M sub-block of a parent block of video data, M being a positive integer value less than N.

Clause 66: The device of any of clauses 64 and 65, wherein when at least one sample of the first N×N window is outside of the boundary of the first reference picture or at least one sample of the second N×N window is outside of the boundary of the second reference picture, combining the first prediction block with the second prediction block comprises setting gradient values equal to zero.

Clause 67: The device of any of clauses 60-66, wherein the one or more processors are further configured to encode the block before decoding the block.

Clause 68: The device of any of clauses 60-67, further comprising a display configured to display the decoded video data.

Clause 69: The device of any of clauses 60-68, wherein the device comprises one or more of a camera, a computer, a mobile device, a broadcast receiver device, or a set-top box.

Clause 70: A device for decoding video data, the device comprising: means for determining that a block of video data is to be predicted using bi-directional optical flow (BDOF); means for forming motion information for the block, the motion information including a first motion vector referring to a first picture of a first reference picture list and a second motion vector referring to a second reference picture of a second reference picture list; means for forming a first prediction block using the first motion vector and a second prediction block using the second motion vector; means for combining the first prediction block with the second prediction block according to BDOF to form a final prediction block; means for determining that a first predictor for at least one sample location of the final prediction block is outside of a boundary of the first reference picture; means for determining that a second predictor for the at least one sample location is within a boundary of the second reference picture; means for setting the first predictor equal to the second predictor; and means for determining a final BDOF value for a sample at the at least one sample location using the first predictor and the second predictor.

Clause 71: A computer-readable storage medium having stored thereon instructions that, when executed, cause a processor to: determine that a block of the video data is to be predicted using bi-directional optical flow (BDOF); form motion information for the block, the motion information including a first motion vector referring to a first picture of a first reference picture list and a second motion vector referring to a second reference picture of a second reference picture list; form a first prediction block using the first motion vector and a second prediction block using the second motion vector; combine the first prediction block with the second prediction block according to BDOF to form a final prediction block, wherein for at least one sample location of the final prediction block, the one or more processors are configured to: determine that a first predictor for the at least one sample location is outside of a boundary of the first reference picture; determine that a second predictor for the at least one sample location is within a boundary of the second reference picture; set the first predictor equal to the second predictor; and determine a final BDOF value for a sample at the at least one sample location using the first predictor and the second predictor.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining that a block of video data is to be predicted using bi-directional optical flow (BDOF);
   forming motion information for the block, the motion information including a first motion vector referring to a first picture of a first reference picture list and a second motion vector referring to a second reference picture of a second reference picture list;
   forming a first prediction block using the first motion vector and a second prediction block using the second motion vector;
   combining the first prediction block with the second prediction block according to BDOF to form a final prediction block, wherein for at least one sample location of the final prediction block, the method includes:
      determining that a first predictor for the at least one sample location is outside of a boundary of the first reference picture, the first predictor corresponding to a first sample value of a first reference block of the first reference picture to which the first motion vector refers;
      determining that a second predictor for the at least one sample location is within a boundary of the second reference picture, the second predictor corresponding to a second sample value of a second reference block of the second reference picture to which the second motion vector refers;
      in response to the first predictor being outside of the boundary of the first reference picture and the second predictor being within the boundary of the second reference picture, setting the first predictor equal to the second predictor to generate a modified first predictor;
      calculating gradients for performing prediction refinement with optical flow (PROF) using the modified first predictor and the second predictor; and
      determining a final BDOF value for a sample at the at least one sample location using the modified first predictor, the second predictor, and the calculated gradients.

2. The method of claim 1, wherein the sample location comprises (x, y), the first predictor comprises $I^{(0)}(x, y)$, the second predictor comprises $I^{(1)}(x, y)$, b(x, y) comprises an adjustment value, and $O_{offset}$ comprises an offset value.

3. The method of claim 2, wherein determining the final BDOF value for the sample at the at least one sample location comprises calculating the final BDOF value for the sample according to $(I^{(1)}(x, y)+I^{(1)}(x, y)+b(x, y)+o_{offset})\text{>>shift5}$, wherein ">>" comprises a bitwise right shift operator and shift5 is equal to Max(3, 15−BitDepth), wherein Max(x, y) returns a maximum between x and y, and wherein BitDepth represents a bit depth of a video bitstream including the block of video data.

4. The method of claim 2, further comprising determining the adjustment value according to $$b(x, y) = v_x \cdot \left( \frac{\partial I^{(1)}(x, y)}{\partial x} - \frac{\partial I^{(0)}(x, y)}{\partial x} \right) + v_y \cdot \left( \frac{\partial I^{(1)}(x, y)}{\partial y} - \frac{\partial I^{(0)}(x, y)}{\partial y} \right).$$

wherein $$\frac{\partial I^{(1)}(x, y)}{\partial x}$$

comprises a horizontal gradient for the second predictor, $$\frac{\partial I^{(0)}(x, y)}{\partial x}$$

comprises a horizontal gradient for the modified first predictor, $$\frac{\partial I^{(1)}(x, y)}{\partial y}$$

comprises a vertical gradient for the second predictor, $$\frac{\partial I^{(0)}(x, y)}{\partial y}$$

comprises a vertical gradient for the modified first predictor, $v_x$ comprises a horizontal component of a refinement vector, and $v_y$ comprises a vertical component of the refinement vector.

5. The method of claim 1, wherein the first predictor is included in a first N×N window, N being a positive integer value, and wherein the second predictor is included in a second N×N window.

6. The method of claim 5, wherein the block comprises an M×M sub-block of a parent block of video data, M being a positive integer value less than N.

7. The method of claim 5, wherein when at least one sample of the first N×N window is outside of the boundary of the first reference picture or at least one sample of the second N×N window is outside of the boundary of the second reference picture, combining the first prediction block with the second prediction block comprises setting gradient values equal to zero.

8. The method of claim 1, wherein forming the first motion vector comprises:
   determining that an initial version of the first motion vector refers to an area that is outside of a boundary of the first reference picture;
   in response to determining that the first motion information refers to the area that is outside of the boundary of the first reference picture:
      modifying the initial version of the first motion vector to form a final version of the first motion vector that refers to a portion of the first reference picture that is within the boundary of the first reference picture; and
      storing the final version of the first motion vector as stored motion information for the block.

9. The method of claim 8, further comprising predicting motion information for a second, different block using the stored motion information for the block.

10. The method of claim 1, wherein combining the first prediction block with the second prediction block comprises combining the first prediction block with the second prediction block after determining both that the first motion vector refers to a portion of the first reference picture that is entirely within boundaries of the first reference picture and that the second motion vector refers to a portion of the second reference picture that is entirely within boundaries of the second reference picture.

11. The method of claim 1, wherein the block comprises a first block, the method further comprising, for a second block of the video data:
   determining that at least one sample of the second block has a motion vector that points to a position outside of a reference picture boundary; and
   setting one of the gradients for the at least one sample equal to zero.

12. The method of claim 1, wherein the block comprises a first block, the method further comprising, for a second block of the video data:
   generating a first predictor using motion information for the second block;
   generating a second predictor using motion information for a neighboring block to the second block, the motion information for the neighboring block including two motion vectors;
   in response to the two motion vectors of the motion information for the neighboring block both referring to reference blocks outside of respective reference pictures relative to the second block, discarding the second predictor.

13. The method of claim 1, wherein the block comprises a first block, the method further comprising, for a second block of the video data:
   generating a first predictor using intra-prediction;
   generating a second predictor using inter-prediction, wherein motion information for generating the second predictor refers to a reference block outside of a boundary of a reference picture; and
   generating a final predictor for the second block using the first predictor and the second predictor.

14. The method of claim 13, wherein generating the final predictor comprises applying a first weight to the first predictor and a second weight to the second predictor, the second weight being less than a third weight that is used when the motion information refers to a reference block fully within the boundary of the reference picture.

15. The method of claim 1, wherein forming the motion information comprises forming at least one of the first motion vector or the second motion vector using merge mode, and wherein forming the at least one of the first motion vector or the second motion vector using merge mode comprises:
   determining, for a merge candidate, at least one of:
      that the merge candidate is a uni-prediction candidate and an entire reference block identified by the uni-prediction candidate is outside of a boundary of a reference picture;
      that the merge candidate is a uni-prediction candidate and at least a portion of a reference block identified by the uni-prediction candidate is outside of the boundary of the reference picture;
      that the merge candidate is a bi-prediction candidate and that entire reference blocks identified by the bi-prediction candidate are outside of respective boundaries of respective reference pictures for the bi-prediction candidate; or
      that the merge candidate is a bi-prediction candidate and that at least portions of reference blocks identified by the bi-prediction candidate are outside of respective boundaries of respective reference pictures for the bi-prediction candidate, and in response to the determination, skipping addition of the merge candidate to a merge candidate list for a current block.

16. The method of claim 1, wherein forming the motion information comprises decoding the motion information.

17. The method of claim 1, further comprising encoding the current block prior to decoding the current block.

18. The method of claim 1, wherein combining the first prediction block with the second prediction block further comprises, for an at least second sample location of the final prediction block:
   determining that a third predictor for the at least second sample location is within the boundary of the first reference picture, the third predictor corresponding to a third sample value of the first reference block;
   determining that a fourth predictor for the at least second sample location is within the boundary of the second reference picture, the fourth predictor corresponding to a fourth sample value of the second reference block; and
   determining a final BDOF value for a sample at the at least second sample location using the third predictor and the fourth predictor.

19. A device for decoding video data, the device comprising:
a memory configured to store video data; and
one or more processors implemented in circuitry and configured to:
determine that a block of the video data is to be predicted using bi-directional optical flow (BDOF);
form motion information for the block, the motion information including a first motion vector referring to a first picture of a first reference picture list and a second motion vector referring to a second reference picture of a second reference picture list;
form a first prediction block using the first motion vector and a second prediction block using the second motion vector;
combine the first prediction block with the second prediction block according to BDOF to form a final prediction block, wherein for at least one sample location of the final prediction block, the one or more processors are configured to:
determine that a first predictor for the at least one sample location is outside of a boundary of the first reference picture, the first predictor corresponding to a first sample value of a first reference block of the first reference picture to which the first motion vector refers;
determine that a second predictor for the at least one sample location is within a boundary of the second reference picture, the second predictor corresponding to a second sample value of a second reference block of the second reference picture to which the second motion vector refers;
in response to the first predictor being outside of the boundary of the first reference picture and the second predictor being within the boundary of the second reference picture, set the first predictor equal to the second predictor;
predictor to generate a modified first predictor;
calculate gradients for performing prediction refinement with optical flow (PROF) using the modified first predictor and the second predictor and
determine a final BDOF value for a sample at the at least one sample location using the modified first predictor the second predictor, and the calculated gradients.

20. The device of claim 19, wherein the sample location comprises (x, y), the first predictor comprises $I^{(0)}(x, y)$, the second predictor comprises $I^{(1)}(x, y)$, b(x, y) comprises an adjustment value, and $O_{offset}$ comprises an offset value.

21. The device of claim 20, wherein to determine the final BDOF value for the sample at the at least one sample location, the one or more processors are configured to calculate the final BDOF value for the sample according to $(I^{(1)}(x, y)+I^{(1)}(x, y)+b(x, y)+o_{offset})\gg shift5$, wherein "$\gg$" comprises a bitwise right shift operator and shift5 is equal to Max(3, 15−BitDepth), wherein Max(x, y) returns a maximum between x and y, and wherein BitDepth represents a bit depth of a video bitstream including the block of video data.

22. The device of claim 20, wherein the one or more processors are further configured to determine the adjustment value according to $$b(x, y) = v_x \cdot \left(\frac{\partial I^{(1)}(x, y)}{\partial x} - \frac{\partial I^{(0)}(x, y)}{\partial x}\right) + v_y \cdot \left(\frac{\partial I^{(1)}(x, y)}{\partial y} - \frac{\partial I^{(0)}(x, y)}{\partial y}\right),$$

wherein $$\frac{\partial I^{(1)}(x, y)}{\partial x}$$

comprises a horizontal gradient for the second predictor, $$\frac{\partial I^{(0)}(x, y)}{\partial x}$$

comprises a horizontal gradient for the modified first predictor, $$\frac{\partial I^{(1)}(x, y)}{\partial y}$$

comprises a vertical gradient for the second predictor, $$\frac{\partial I^{(0)}(x, y)}{\partial y}$$

comprises a vertical gradient for the modified first predictor, $v_x$ comprises a horizontal component of a refinement vector, and $v_y$ comprises a vertical component of the refinement vector.

23. The device of claim 19, wherein the first predictor is included in a first N×N window, N being a positive integer value, and wherein the second predictor is included in a second N×N window.

24. The device of claim 23, wherein the block comprises an M×M sub-block of a parent block of video data, M being a positive integer value less than N.

25. The device of claim 23, wherein when at least one sample of the first N×N window is outside of the boundary of the first reference picture or at least one sample of the second N×N window is outside of the boundary of the second reference picture, combining the first prediction block with the second prediction block comprises setting gradient values equal to zero.

26. The device of claim 19, wherein to form the motion information, the one or more processors are configured to decode the motion information.

27. The device of claim 19, wherein the one or more processors are further configured to encode the block before decoding the block.

28. The device of claim 19, further comprising a display configured to display the decoded video data.

29. The device of claim 19, wherein the device comprises one or more of a camera, a computer, a mobile device, a broadcast receiver device, or a set-top box.

30. A device for decoding video data, the device comprising:
means for determining that a block of video data is to be predicted using bi-directional optical flow (BDOF);
means for forming motion information for the block, the motion information including a first motion vector referring to a first picture of a first reference picture list and a second motion vector referring to a second reference picture of a second reference picture list;
means for forming a first prediction block using the first motion vector and a second prediction block using the second motion vector;

means for combining the first prediction block with the second prediction block according to BDOF to form a final prediction block, comprising;
  means for determining that a first predictor for at least one sample location of the final prediction block is outside of a boundary of the first reference picture, the first predictor corresponding to a first sample value of a first reference block of the first reference picture to which the first motion vector refers;
  means for determining that a second predictor for the at least one sample location is within a boundary of the second reference picture, the second predictor corresponding to a second sample value of a second reference block of the second reference picture to which the second motion vector refers;
  means for setting, in response to the first predictor being outside of the boundary of the first reference picture and the second predictor being within the boundary of the second reference picture, the first predictor equal to the second predictor to generate a modified first predictor;
  means for calculating gradients for performing prediction refinement with optical flow (PROF) using the modified first predictor and the second predictor; and
means for determining a final BDOF value for a sample at the at least one sample location using the modified first predictor, the second predictor, and the calculated gradients.

* * * * *